US009738342B2

(12) United States Patent
Stillinger et al.

(10) Patent No.: US 9,738,342 B2
(45) Date of Patent: Aug. 22, 2017

(54) STEERING ASSEMBLIES FOR MULTI-WHEELED VEHICLES AND MULTI-WHEELED VEHICLES INCLUDING THE STEERING ASSEMBLIES

(71) Applicant: Acorn Products, LLC, Monte Sereno, CA (US)

(72) Inventors: Scott H. Stillinger, Monte Sereno, CA (US); Kathryn Kelsey Anne Stillinger, Los Gatos, CA (US)

(73) Assignee: Acorn Products, LLC, Monte Sereno, CA (US)

( * ) Notice: Subject to any disclaimer, the term of this patent is extended or adjusted under 35 U.S.C. 154(b) by 0 days.

(21) Appl. No.: 14/938,617

(22) Filed: Nov. 11, 2015

(65) Prior Publication Data

US 2016/0137250 A1    May 19, 2016

Related U.S. Application Data

(60) Provisional application No. 62/079,385, filed on Nov. 13, 2014.

(51) Int. Cl.
| | |
|---|---|
| *B62K 5/08* | (2006.01) |
| *B62M 1/00* | (2010.01) |
| *B62K 3/00* | (2006.01) |
| *B62K 21/00* | (2006.01) |

(52) U.S. Cl.
CPC ............... *B62K 3/002* (2013.01); *B62K 5/08* (2013.01); *B62K 21/005* (2013.01)

(58) Field of Classification Search
CPC ........ B62K 3/002; B62K 5/08; B62K 21/005; B62M 1/00; A63C 17/06; A63C 17/062; A63C 17/064; A63C 17/265

USPC .............. 280/87.021, 87.041, 87.042
See application file for complete search history.

(56) References Cited

U.S. PATENT DOCUMENTS

| | | | |
|---|---|---|---|
| 3,207,562 A | 9/1965 | Ewing | |
| 3,710,886 A | 1/1973 | Wagner | |
| 3,724,580 A | 4/1973 | Adams, Jr. | |
| 3,929,204 A | 12/1975 | Newell | |
| 4,062,557 A * | 12/1977 | Roden .................... | A63C 17/01 |
| | | | 280/11.27 |
| 4,620,602 A | 11/1986 | Capriotti | |

(Continued)

FOREIGN PATENT DOCUMENTS

CN         2452874 Y       10/2001

OTHER PUBLICATIONS

English-language abstract of Chinese Utility Model CN2452874Y, Oct. 10, 2001.

*Primary Examiner* — Frank Vanaman
(74) *Attorney, Agent, or Firm* — Dascenzo Intellectual Property Law, P.C.

(57) ABSTRACT

Multi-wheeled vehicles, such as scooters, may include a body, a rear wheel, and a steering assembly. The steering assembly may include a steering shaft, a wheel support chassis, a first front wheel, and a second front wheel. The wheel support chassis is pivotally coupled to the steering shaft for rotation about a chassis pivot axis. The first and second front wheels are rotatingly coupled to the wheel support chassis about respective rotational axes. The second front wheel is at least substantially inline with the first front wheel and located closer to the rear wheel than the first front wheel when the steering shaft is in a forward straight orientation.

37 Claims, 6 Drawing Sheets

(56) References Cited

U.S. PATENT DOCUMENTS

| | | | |
|---|---|---|---|
| 4,799,702 A * | 1/1989 | Wang | B62K 21/00 |
| | | | 280/87.041 |
| 5,342,071 A * | 8/1994 | Soo | A63C 17/0046 |
| | | | 280/11.207 |
| 5,343,960 A | 9/1994 | Gilbert | |
| 5,361,860 A | 11/1994 | Smith et al. | |
| 5,855,248 A | 1/1999 | Rawson et al. | |
| 6,135,220 A | 10/2000 | Gleasman et al. | |
| 6,227,551 B1 * | 5/2001 | Roy | A63C 17/062 |
| | | | 280/11.223 |
| 6,286,843 B1 * | 9/2001 | Lin | A63C 17/0066 |
| | | | 280/11.28 |
| 6,293,560 B1 | 9/2001 | Byatt | |
| 6,343,798 B1 | 2/2002 | Chen et al. | |
| 6,386,562 B1 | 5/2002 | Kuo | |
| 6,494,470 B2 | 12/2002 | Chang | |
| 6,808,188 B1 | 10/2004 | Fan | |
| 6,981,563 B2 | 1/2006 | Phely et al. | |
| 7,857,333 B2 | 12/2010 | Contarino | |
| 7,886,852 B2 | 2/2011 | Bernard et al. | |
| 8,074,751 B2 | 12/2011 | Bernard et al. | |
| 8,240,408 B2 | 8/2012 | Bernard et al. | |
| 8,505,937 B2 | 8/2013 | Epstein | |
| 8,915,506 B2 * | 12/2014 | Piaceski | A63C 17/0033 |
| | | | 280/11.27 |
| 2002/0023788 A1 | 2/2002 | Torrie et al. | |
| 2002/0096849 A1 | 7/2002 | Bang | |
| 2002/0167146 A1 | 11/2002 | Chang | |
| 2004/0195794 A1 * | 10/2004 | Fan | B62H 1/12 |
| | | | 280/87.01 |
| 2007/0182123 A1 | 8/2007 | Bryant | |
| 2007/0235970 A1 | 10/2007 | Stillinger | |
| 2012/0326408 A1 | 12/2012 | Bellon | |
| 2013/0001909 A1 | 1/2013 | Stillinger et al. | |
| 2013/0307240 A1 | 11/2013 | Petutschnig | |

* cited by examiner

STEERING ASSEMBLIES FOR MULTI-WHEELED VEHICLES AND MULTI-WHEELED VEHICLES INCLUDING THE STEERING ASSEMBLIES

RELATED APPLICATION

This application claims priority to U.S. Provisional Patent Application Ser. No. 62/079,385, entitled "STEERING ASSEMBLIES FOR MULTI-WHEELED VEHICLES AND MULTI-WHEELED VEHICLES INCLUDING THE STEERING ASSEMBLIES," which was filed on Nov. 13, 2014, the complete disclosure of which is hereby incorporated by reference for all purposes.

FIELD OF THE DISCLOSURE

The present disclosure relates generally to steering assemblies for multi-wheeled vehicles, and more specifically to steering assemblies that include dual inline front wheels and/or to multi-wheeled vehicles that include the steering assemblies.

BACKGROUND

A variety of recreational, multi-wheeled vehicles are known, including scooters, skateboards, and bicycles. Scooters are vehicles that typically include a rider platform, or deck, on which a rider may stand with one or two feet; front and rear wheel assemblies that each includes at least one wheel; and a steering shaft that is connected to one or more front wheels to convey steering inputs from the rider to the front wheel assembly. Many scooters are rider-powered devices, in which a rider propels the scooter along a riding surface, such as the ground, by pushing or kicking against the riding surface with one of the rider's feet, with the other foot being used to support the rider on the rider platform of the scooter.

To steer a conventional scooter, the rider rotates the scooter's steering shaft about its longitudinal axis to steer, or orient, the scooter's front wheel(s) in the desired direction of travel. In some conventional scooters, the scooter is steered by pushing, or pivoting, the scooter's steering shaft in the desired direction of movement, with this pushing, or pivoting, movement orienting the scooter to travel in the selected direction. In some conventional scooters, at least a set of front or rear wheels are mounted on a truck, which is coupled to the rider platform, typically on or adjacent the underside thereof. Such a scooter may be steered by the rider leaning or shifting the rider's weight laterally to tip or pivot the rider platform relative to its long axis, thereby imparting steering forces to the wheels of the truck to steer the scooter.

Many conventional scooters are configured, such as via the orientation and/or construction of the scooter's steering assembly and/or front wheel assembly, to assist the rider in steering the scooter by creating turning, or steering, forces that urge the scooter toward a greater steering, or turning, angle. Such a configuration may be helpful to assist riders to achieve a desired turning orientation that may include a desired steering angle and/or may assist riders to achieve such a steering angle with less force required to be applied by the rider. However, these steering forces, when present, also oppose restoring, or stabilizing, forces that urge the steering assembly to a neutral, forward, or straight orientation.

SUMMARY

Multi-wheeled vehicles and steering assemblies for multi-wheeled vehicles are disclosed. In one embodiment, a multi-wheeled vehicle, such as a scooter, comprises a body configured to support a rider, a rear wheel rotatingly coupled to the body, and a steering assembly. The steering assembly includes a steering shaft rotationally coupled to the body about a steering pivot axis. The steering shaft is configured to permit rotation of the steering assembly about the steering pivot axis among a plurality of steering orientations that includes at least a forward straight orientation, in which the steering assembly is oriented to direct the multi-wheeled vehicle on a straight, forward trajectory, and a turning orientation, in which the steering assembly is oriented to direct the multi-wheeled vehicle on a curved trajectory. The steering assembly also includes a wheel support chassis pivotally coupled to the steering shaft for rotation about a chassis pivot axis, a first front wheel rotatingly coupled to the wheel support chassis about a first front rotational axis, and a second front wheel rotatingly coupled to the wheel support chassis about a second front rotational axis. The second front wheel is at least substantially inline with the first front wheel and located closer to the rear wheel than the first front wheel when the steering shaft is in the forward straight orientation. The multi-wheeled vehicle also includes a chassis pivot stop configured to restrict rotation of the wheel support chassis about the chassis pivot axis to within a chassis pivot angle range.

In another embodiment, the above steering assembly is replaced by a steering assembly that includes a steering shaft, a wheel support chassis, a first front wheel, and a second front wheel. The wheel support chassis is pivotally coupled to the steering shaft for rotation about the chassis pivot axis. The first front wheel is rotatingly coupled to the wheel support chassis about a first front rotational axis. The second front wheel is rotatingly coupled to the wheel support chassis about a second front rotational axis. The second front wheel is at least substantially inline with the first front wheel and, while the steering assembly is in a forward straight orientation, the second front wheel is located closer to the rear wheel of the multi-wheeled vehicle than the first front wheel. The wheel support chassis operatively retains the first front wheel and the second front wheel relative to the steering pivot axis such that, when the steering assembly is in the turning orientation and the multi-wheeled vehicle is being propelled across a riding surface by the rider, a straightening net torque generated between the steering assembly and the riding surface urges the steering assembly toward the forward straight orientation. In addition, the wheel support chassis operatively retains the first front wheel and the second front wheel relative to the steering pivot axis such that, when the multi-wheeled vehicle is being propelled across the riding surface by the rider and the rider leans in a turning direction such that the scooter is in a leaning orientation, a turning net torque generated between the steering assembly and the riding surface urges the steering assembly in the turning direction.

DESCRIPTION

Figure 1:
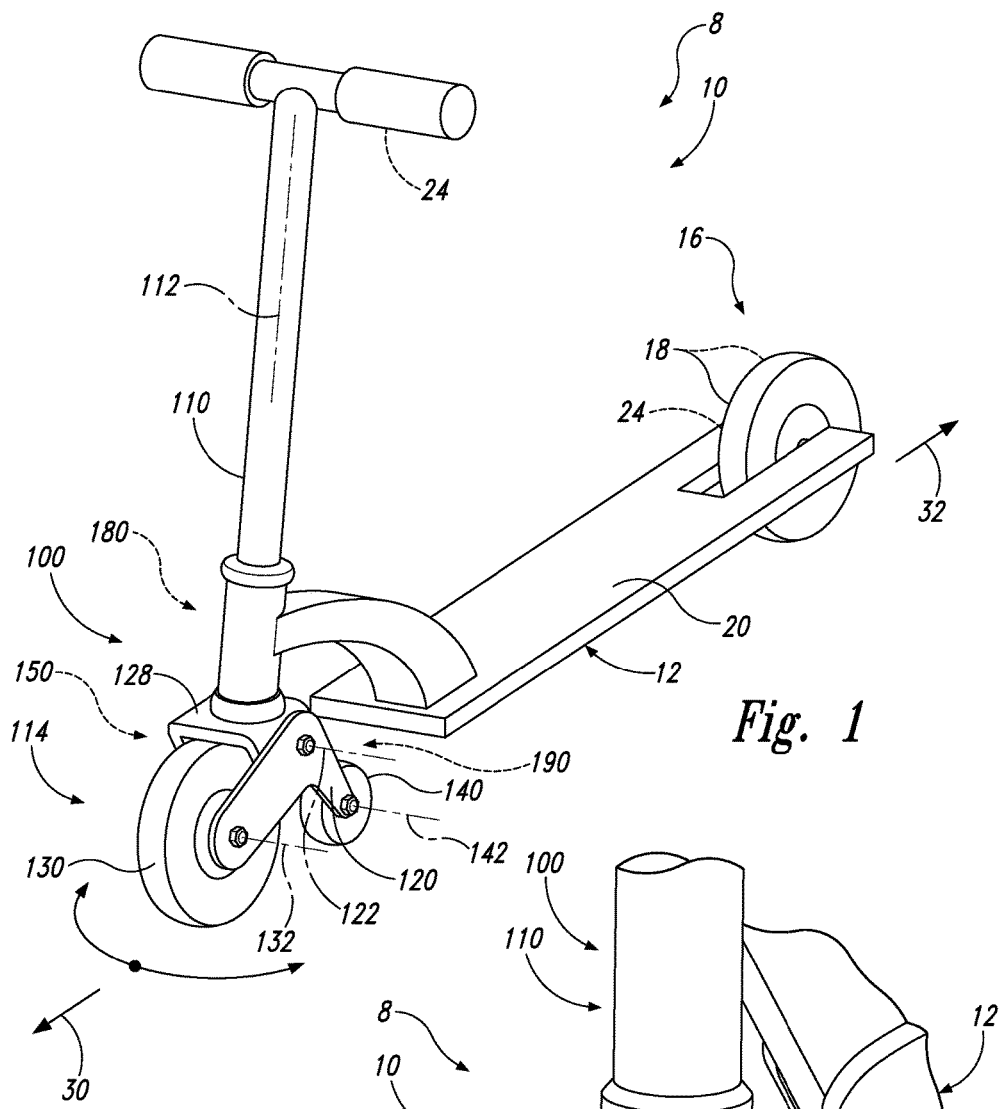
FIG. 1 is a schematic representation of an example of a multi-wheeled vehicle, according to the present disclosure, in the form of a scooter.

FIGS. 1-13 provide illustrative, non-exclusive examples of multi-wheeled vehicles 8, such as scooters 10, that include steering assemblies 100 according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
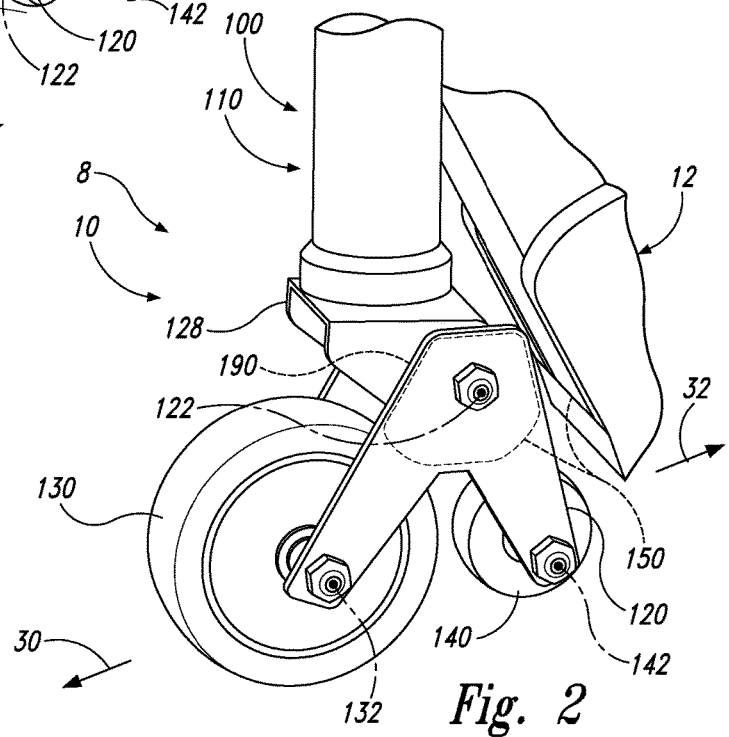
FIG. 2 is a schematic representation of a portion of a scooter according to the present disclosure.

FIG. 1 is a schematic representation of an example of a multi-wheeled vehicle 8, according to the present disclosure, in the form of a scooter 10, while FIG. 2 is a schematic representation of a front portion of a multi-wheeled vehicle 8. Multi-wheeled vehicle 8 includes a steering assembly 100 according to the present disclosure. Multi-wheeled vehicle 8 according to the present disclosure may include a body 12, which may include, define, and/or form a rider platform 20 (as illustrated in FIG. 1) that is configured to support a rider. The rider is an individual who stands upon the rider platform 20 and imparts steering inputs to steering assembly 100, as discussed in more detail herein. Multi-wheeled vehicle 8 further includes a rear wheel assembly 16 that includes at least one rear wheel 18 that is rotatingly coupled to body 12.

Figure 7:
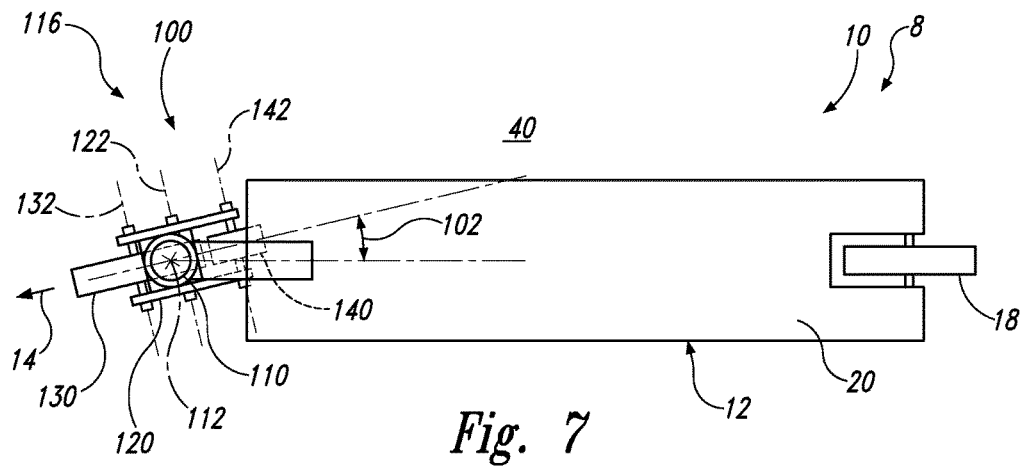
FIG. 7 is a schematic view of a scooter that includes a steering assembly according to the present disclosure as viewed down a steering pivot axis of the scooter.
Figure 8:
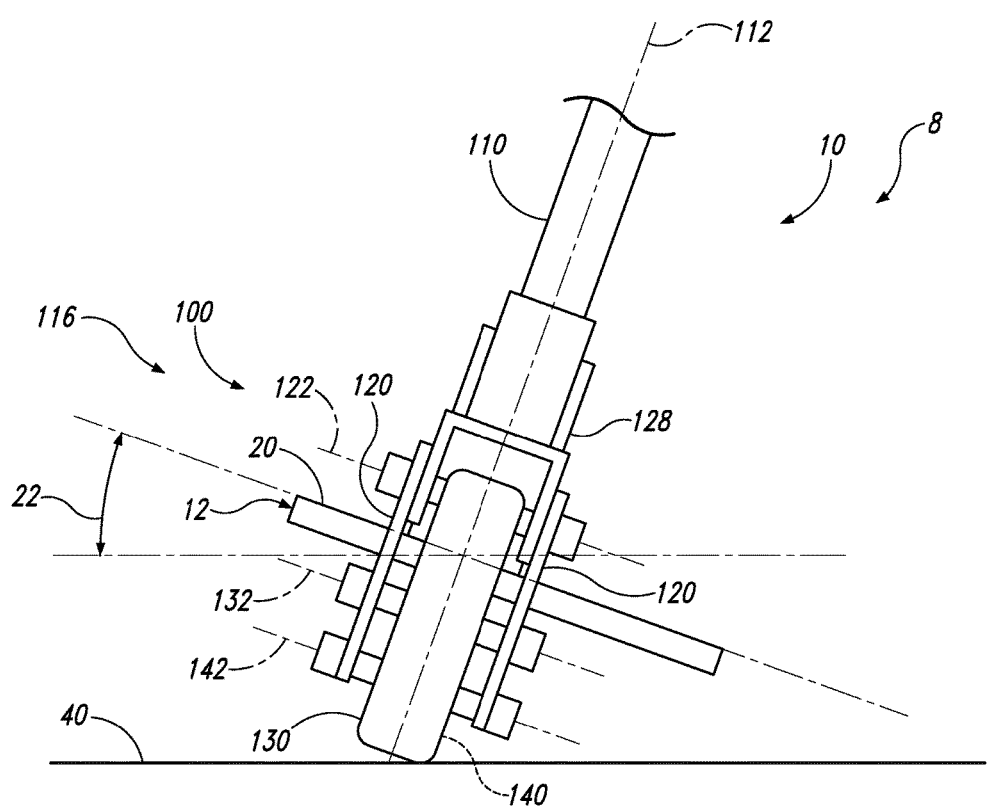
FIG. 8 is a schematic view of the scooter of FIG. 7 as viewed from a direction of travel of the scooter.

Steering assembly 100 includes a steering shaft 110, which may be rotationally coupled to body 12 and configured to pivot and/or rotate relative to body 12 about a steering pivot axis 112. The steering shaft 110 may be referred to as the steering column. The steering shaft 110 and/or the steering pivot axis 112 may project from steering assembly 100 upwardly and/or divergently away from rider platform 20. The multi-wheeled vehicle 8 (e.g., scooter 10) may be steered via rotation of steering assembly 100 among a plurality of steering orientations that includes at least a forward straight orientation 114 (as illustrated in FIG. 1) and a turning orientation 116 (as illustrated in FIGS. 7-8). When steering assembly 100 is in forward straight orientation 114, the steering assembly may be oriented to direct multi-wheeled vehicle 8 on and/or along a straight, or at least substantially straight, and forward trajectory. Conversely, when steering assembly 100 is in turning orientation 116, the steering assembly may be oriented to direct multi-wheeled vehicle 8 on and/or along a curved, or arcuate, trajectory. In some embodiments, multi-wheeled vehicle 8 may permit a backward orientation of the steering assembly 110, in which the steering assembly is rotated 180° (about the steering pivot axis 112) from the forward straight orientation 114. The curved arrow in front of the steering assembly 100 indicates an example of a range of steering orientations, with the central dot indicating the forward straight orientation.

Steering assembly 100 may include at least one handle distal the portion of the steering assembly 110 that is connected to the body 12 of the multi-wheeled vehicle 8 (and/or distal the ground or other riding surface upon which the multi-wheeled vehicle travels during use). The one or more handles may take any suitable form or configuration that is suitable for a rider to grasp with at least one of the rider's hands while operating multi-wheeled vehicle 8. Handles may include a left hand grip, a right hand grip, and/or a central hand grip. Examples of suitable handles include handlebars, hand grips, steering knobs, and the like. Handles typically project at least laterally away from the upper portion of the steering shaft 110, such as to have a T-shaped configuration (similar to the example of FIG. 1), a Y-shaped configuration, or an L-shaped configuration, although these construction types are not required of all embodiments. The rider may convey steering inputs to the steering assembly by grasping one or more handles of the steering assembly and exerting forces, such as lateral and/or rotational forces (with respect to the steering pivot axis), thereto that are conveyed as steering inputs through the steering assembly to the front wheels of the steering assembly.

Steering assembly 100 further includes a wheel support chassis 120. Wheel support chassis 120 is pivotally coupled to steering shaft 110 about a chassis pivot axis 122 (e.g., via an axle, pin, or shaft aligned with the chassis pivot axis). Thus, wheel support chassis 120 is configured to rotate and/or pivot about steering pivot axis 112 with, or responsive to rotation of, steering shaft 110, such as to permit steering of multi-wheeled vehicle 8. In addition, wheel support chassis 120 also is configured to rotate and/or pivot relative to steering shaft 110 about chassis pivot axis 122, such as to permit a first front wheel 130 and a second front wheel 140 to both remain in contact with a riding surface over a range of riding surface curvatures, profiles, and/or topographies. The chassis pivot axis 122 is perpendicular, or at least substantially perpendicular, to the steering pivot axis 112.

The wheel support chassis 120 may be coupled directly or indirectly about the chassis pivot axis 122, e.g., coupled directly or indirectly to an axle aligned with the chassis pivot axis 122 for pivotal movement about the chassis pivot axis 122. For example, the wheel support chassis 120 may be coupled directly to the steering shaft 110 with an axle, pin, or shaft that is aligned with the chassis pivot axis 122. The wheel support chassis 120 may be coupled indirectly to the steering shaft 110 via one or more flexible linkages and/or pivotally coupled linkages. The steering shaft 110 includes a base 128 to which the wheel support chassis 120 is pivotally coupled (directly or indirectly). The base 128 may include a fork, tab, projection, and/or linkage that is rigidly coupled and/or unitary with the remaining steering shaft 110. The base 128 and/or the wheel support chassis 120 may be configured to offset the steering pivot axis 112 and the chassis pivot axis 122 such that the axes do not intersect. Generally, the steering pivot axis 112 is forward of (leads) the chassis pivot axis 122 when the multi-wheeled vehicle is in the forward straight orientation 114.

Steering assembly 100 also includes first front wheel 130 and second front wheel 140. First front wheel 130 also may be referred to herein as a wheel 130, as a front steering wheel 130, as a forward steering wheel 130, as a leading steering wheel 130, and/or as a leading wheel 130 and is rotatingly coupled to wheel support chassis 120 about a first front rotational axis 132 (e.g., via an axle, pin, or shaft aligned with the first front rotational axis). Second front wheel 140 also may be referred to herein as a wheel 140, as a rearward steering wheel 140 and/or as a trailing steering wheel 140 and is rotatingly coupled to wheel support chassis 120 about a second front rotational axis 142 (e.g., via an axle, pin, or shaft aligned with the second front rotational axis). Thus, wheel 130 is configured to rotate relative to wheel support chassis 120 about first front rotational axis 132, and wheel 140 is configured to rotate relative to wheel support chassis 120 about second front rotational axis 142. Wheel 140 may be (at least substantially) aligned with and/or inline with wheel 130 and/or wheel support chassis 120 may retain wheel 140 aligned with and/or inline with wheel 130.

When steering assembly 100 is in, or near, the forward straight orientation 114, the first front wheel 130 (i.e., the leading steering wheel) is in front of (leads) the second front wheel 140 (i.e., the trailing steering wheel). For example, second front wheel 140 may be located between first front wheel 130 and rear wheel assembly 16 and/or a distance between second front wheel 140 and rear wheel assembly 16 may be less than a distance between first front wheel 130 and rear wheel assembly 16, at least when steering assembly 100 is in, or near, forward straight orientation 114.

In FIG. 1, a single rear wheel 18 is illustrated, but a rear wheel assembly 16 within the scope of the present disclosure may include more than one rear wheel 18, such as a pair of rear wheels 18. Two or more of the rear wheels 18 may be inline with each other. Additionally or alternatively, two or more rear wheels 18 may rotate along a common rotational axis. Rear wheel assemblies 16 may include a truck to mount the rear wheels 18. The truck may support the rear wheels on opposed sides of the lateral center of the multi-wheeled vehicle 8 and/or on opposed sides of first front wheel 130 and second front wheel 140. The truck may be mounted in any suitable manner and/or may retain the rear wheels 18 at any suitable orientation relative to steering assembly 100, body 12, and/or rider platform 20. As an example, the truck may retain first and second rear wheels beneath body 12 and/or beneath rider platform 20.

Steering assembly 100 may be adapted, configured, designed, and/or constructed to retain first front wheel 130, second front wheel 140, and rear wheel(s) 18 in any suitable relative orientation. As an example, at least one rear wheel 18 may be inline with first front wheel 130 and/or with second front wheel 140, at least when steering assembly 100 is in forward straight orientation 114. As another example, at least one rear wheel 18 also may be out of line with first front wheel 130 and/or with second front wheel 140 when the steering assembly is in the forward straight orientation.

As used herein, the term "inline" may be utilized to indicate that a given structure and/or feature is aligned with another structure and/or feature, is located on the same line as the other structure and/or feature, and/or is configured to track and/or follow the other structure and/or feature during operation of multi-wheeled vehicle 8. In the context of wheels (e.g., wheel 130, wheel 140, and rear wheel 18), the wheels may be described as being aligned when the wheels are configured to roll along the same path. For example, wheel 130 and wheel 140 are inline when a line or plane that extends perpendicular to first front rotational axis 132 and also perpendicular to second front rotational axis 142 may intersect, contact, and/or extend through both of wheel 130 and wheel 140.

During operation of multi-wheeled vehicle 8 according to the present disclosure, the multi-wheeled vehicle may be located and/or placed upon the riding (or ground) surface. The rider may stand on rider platform 20, which may extend (at least partially) between steering assembly 100 and rear wheel assembly 16, between first front wheel 130 and rear wheel assembly 16, and/or between second front wheel 140 and rear wheel assembly 16. To propel the multi-wheeled vehicle, the rider may stand on rider platform 20 with one foot while contacting the riding surface with the rider's other foot to urge and/or propel the multi-wheeled vehicle across the riding surface.

While in motion, the rider may steer the multi-wheeled vehicle 8 by leaning the rider platform, the steering assembly, and/or the steering shaft to the left and/or to the right (i.e., tilting left and/or right), thereby changing an angle of the rider platform relative to the riding surface. This process may be referred to herein as "lean steer" and is discussed in more detail herein with reference to FIGS. 5-8. This change in the angle of the rider platform causes the steering assembly to steer in the direction that the rider leans. The sharpness of the turn, which also may be referred to herein as a turn angle and/or a steering angle, may be based upon the extent of the lean. Furthermore, the rider may select, vary, and/or regulate the turn angle by adjusting the extent of the lean. More specifically, greater amounts of lean produce a sharper turn angle, while lesser amounts of lean produce a less sharp, or more gradual, turn angle. No lean produces no turn and a straight turn angle. Stated another way, for a given amount of lean, the geometry of steering assembly 100 produces a given turn angle, and this turn angle may be selected by varying the amount of lean. Thus, when the multi-wheeled vehicle 8 is in an upright orientation (i.e., the rider platform is substantially parallel to the riding surface), the turn angle may be (substantially) zero degrees (straight). When the multi-wheeled vehicle 8 is leaned to the right, the turn angle of a multi-wheeled vehicle 8 according to the present disclosure automatically changes to steer the multi-wheeled vehicle to the right. When the multi-wheeled vehicle 8 is leaned to the left, the turn angle of a multi-wheeled vehicle according to the present disclosure automatically changes to steer the multi-wheeled vehicle to the left.

Additionally or alternatively, the rider also may steer the multi-wheeled vehicle 8 by rotating steering shaft 110 to the left (counter-clockwise) and/or to the right (clockwise) relative to the riding surface and/or relative to the body 12. Left, right, counter-clockwise, and clockwise are the directions as perceived by a rider riding the multi-wheeled vehicle 8. Steering may include rotating steering shaft 110 about steering pivot axis 112 and is discussed in more detail herein with reference to FIGS. 7-8. Steering by rotation of the steering shaft is not required of all embodiments (e.g., the handle and/or the upward projection of the steering assembly do not rotate the steering shaft). For example, it is within the scope of the present disclosure that the steering shaft may be fixed or otherwise not rotatable relative to the body 12. In such embodiments, the wheel support chassis 120 may be rotationally coupled to body 12 and/or steering shaft 100 for rotational movement about steering pivot axis 112, and wheel support chassis 120 optionally may define steering pivot axis 112 about which the wheel support chassis rotates relative to the body. In such embodiments, the multi-wheeled vehicle may be lean-steered, as described herein, by leaning the rider platform and/or by leaning the steering shaft relative to the riding surface (without rotation of the steering shaft relative to the body).

As discussed in more detail herein, wheel support chassis 120 may be adapted, configured, designed, and/or constructed to operatively retain wheel 130 and wheel 140 in a fixed orientation relative to one another and/or relative to steering pivot axis 112. This fixed orientation may be selected such that, when steering assembly 100 is oriented at the given turn angle (which is based upon the given amount of lean of the rider platform) and is being propelled across the riding surface by the rider, a net torque generated between the steering assembly (i.e., first front wheel 130 and second front wheel 140) urges the steering assembly toward the given turn angle. Expressed in slightly different terms, when the front wheels 130 and 140 are pivoted and/or perturbed away from the given turn angle, the net torque generated by engagement of the riding surface by the front wheels is a negative torque that urges the steering assembly to return the steering assembly to the given turn angle. A magnitude of this net torque may increase as the steering assembly is pivoted and/or perturbed farther from the given turn angle. This force generated by the net torque may be referred to as a restoring force, as the force acts to urge the steering assembly to return to the given turn angle.

This configuration of wheel support chassis 120 may provide several benefits over conventional steering assemblies that do not include first front wheel 130 and second front wheel 140 and/or that do not generate the net torque described above. As an example, steering assembles 100 according to the present disclosure may remain in forward straight orientation 114 when the multi-wheeled vehicle 8 is in the upright orientation and being propelled across the riding surface unless an intentional steering force (i.e., a force sufficient to rotate the steering shaft about the steering pivot axis and/or pivot the steering shaft relative to the riding surface) is applied to steering shaft 110 by the rider. As another example, steering assemblies 100 according to the present disclosure may naturally and/or automatically rotate to the given turn angle, which also may be referred to herein as a given steering orientation, responsive to the rider pivoting and/or leaning the body 12, or rider platform, relative to the riding surface on which the multi-wheeled vehicle 8 is traveling, such that the multi-wheeled vehicle is in a leaning orientation. As yet another example, steering assemblies 100 according to the present disclosure may naturally and/or automatically rotate to the given steering orientation responsive to the rider pushing steering shaft 110 to the left and/or to the right relative to its upright position, thereby causing the steering shaft to pivot relative to the riding surface upon which the multi-wheeled vehicle 8 is traveling and/or causing the multi-wheeled vehicle to be in the leaning orientation. This may increase stability of steering assembly 100, may reduce instability of steering assembly 100, and/or may reduce "wobble" of steering assembly 100 when compared to scooters and other multi-wheeled vehicles with conventional steering assemblies.

The net torque that is generated between the steering assembly and the riding surface may include (or include a sum of) a first torque about the steering pivot axis and a second torque about the steering pivot axis. The first torque may be generated by a first lateral frictional force between forward steering wheel 130 and the riding surface. The second torque may be generated by a second lateral frictional force between rearward steering wheel 140 and the riding surface. The relative orientation of the forward steering wheel 130 and the rearward steering wheel 140 may be selected such that the second torque is greater than the first torque. This is discussed in more detail herein with reference to FIG. 9.

Wheel support chassis 120 also may be adapted, configured, designed, and/or constructed to operatively maintain wheel 130, wheel 140, and steering pivot axis 112 such that, when the rider is supported by body 12 and/or when the rider is standing on rider platform 20, a first normal force between first front wheel 130 and the riding surface is greater than a second normal force between second front wheel 140 and the riding surface. In configurations where first front wheel 130 is larger than second front wheel 140 (as illustrated in FIG. 1), such a weight distribution may permit multi-wheeled vehicle 8 to more easily roll over obstacles that may be present on the riding surface due to the greater (relative) diameter of first front wheel 130.

Wheel support chassis 120 may be adapted, configured, designed, and/or constructed to maintain chassis pivot axis 122 perpendicular to, or at least substantially perpendicular to, steering pivot axis 112. Additionally or alternatively, wheel support chassis 120 may be adapted, configured, designed, and/or constructed to maintain first front rotational axis 132, second front rotational axis 142, and/or chassis pivot axis 122 parallel, or at least substantially parallel, to one another.

Figure 4:
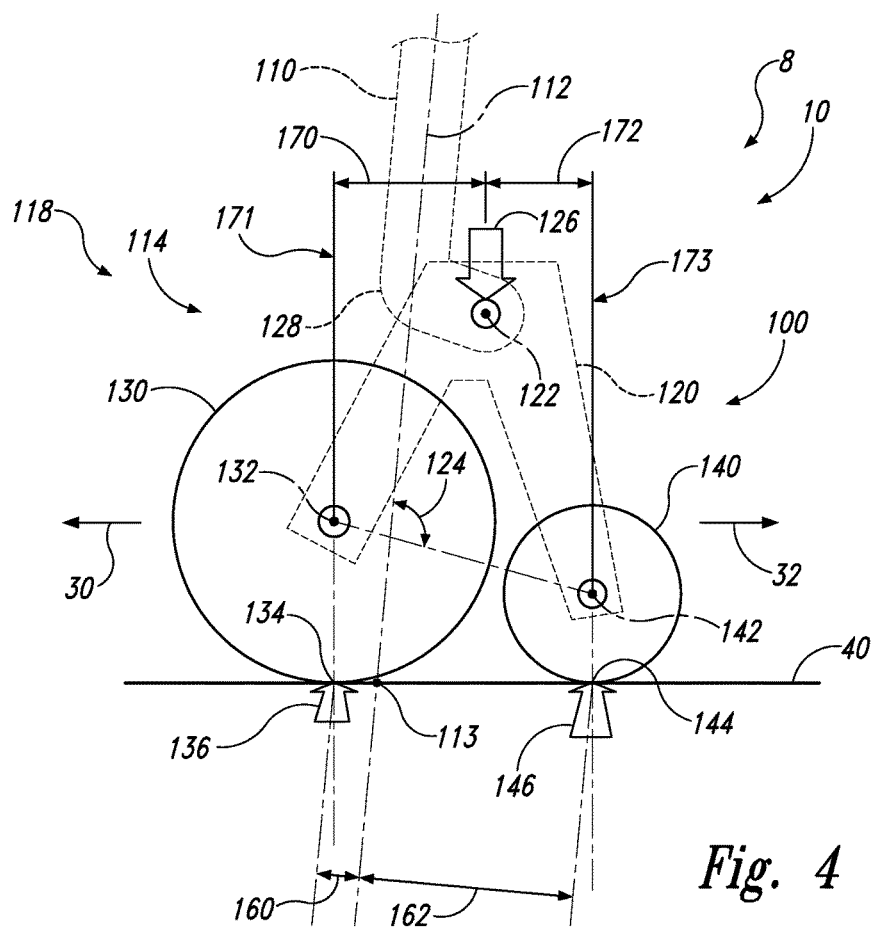
FIG. 4 is a schematic side view of a portion of a steering assembly according to the present disclosure.
Figure 12:
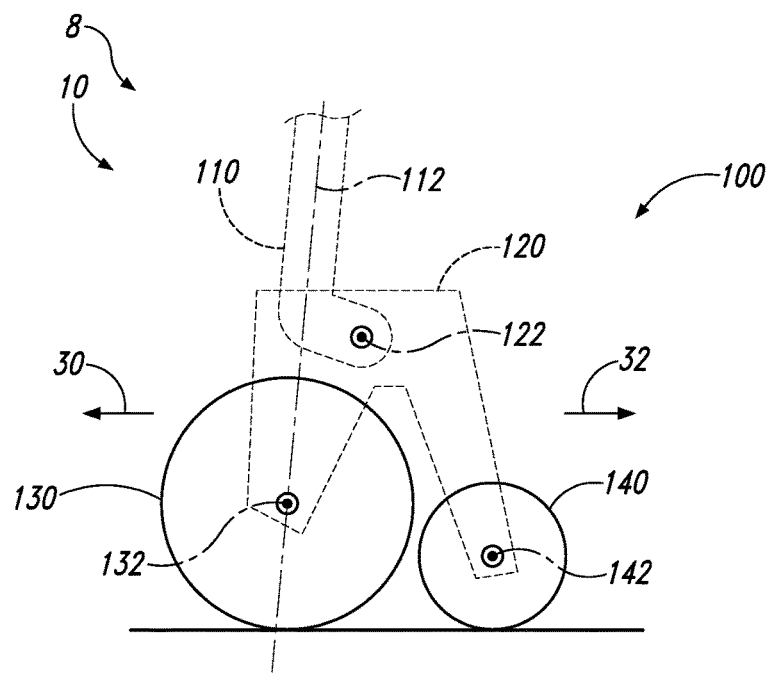
FIG. 12 is a schematic side view of a portion of a steering assembly according to the present disclosure.
Figure 13:
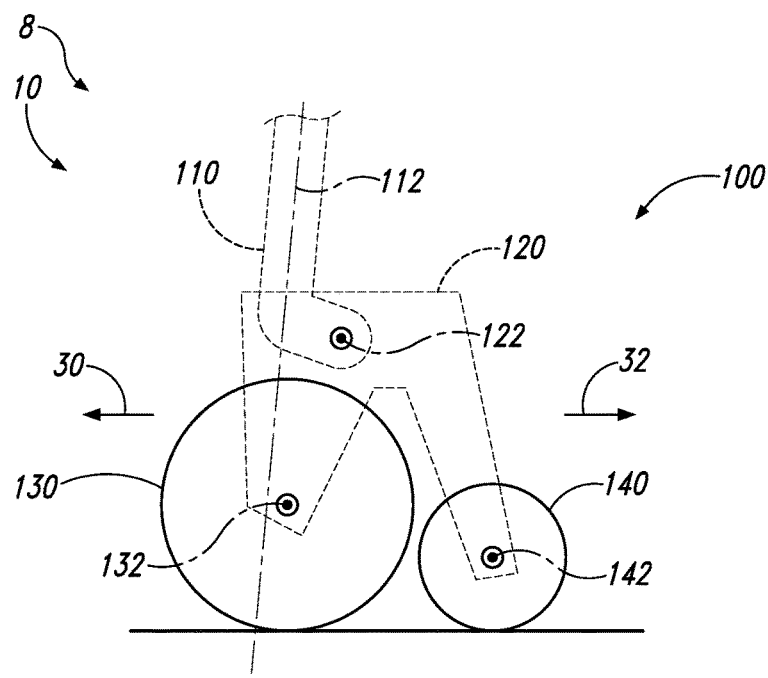
FIG. 13 is a schematic side view of a portion of a steering assembly according to the present disclosure.

Wheel support chassis 120 may be adapted, configured, designed, and/or constructed to maintain first front rotational axis 132 forward of (or located in a forward direction 30 from) steering pivot axis 112, as illustrated in FIG. 4. Alternatively, wheel support chassis 120 also may be adapted, configured, designed, and/or constructed to maintain first front rotational axis 132 such that the first front rotational axis is (at least substantially) intersected by the steering pivot axis, as illustrated in FIG. 12. Alternatively, wheel support chassis 120 also may be adapted, configured, designed, and/or constructed to maintain first front rotational axis 132 such that the first front rotational axis is rearward of (or located in a rearward direction 32 from) steering pivot axis 112, as illustrated in FIG. 13. Wheel support chassis 120 generally is adapted, configured, designed, and/or constructed to maintain second front rotational axis 142 rearward of (or located in rearward direction 32 from) steering pivot axis 112, as illustrated in FIGS. 4, 12, and 13.

Figure 10:
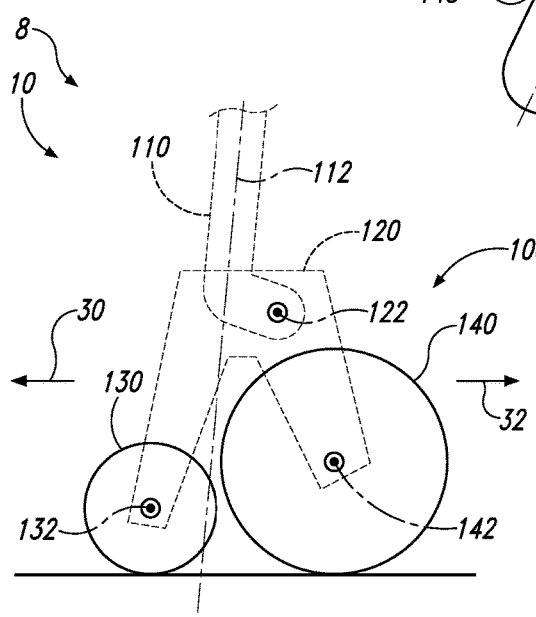
FIG. 10 is a schematic side view of a portion of a steering assembly according to the present disclosure.
Figure 11:
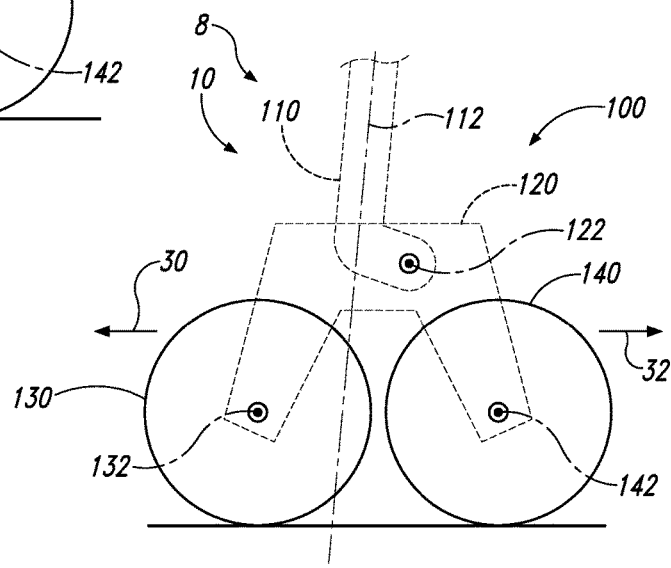
FIG. 11 is a schematic side view of a portion of a steering assembly according to the present disclosure.

Returning to FIGS. 1 and 2, a first outer diameter of first front wheel 130 may be greater than a second outer diameter of second front wheel 140. As examples, a ratio of the first outer diameter to the second outer diameter may be at least 1.1, at least 1.2, at least 1.3, at least 1.4, at least 1.5, at least 1.6, at least 1.7, at least 1.8, at least 1.9, and/or at least 2.0. Alternatively, and as illustrated in FIG. 10, the first outer diameter of first front wheel 130 may be less than the second outer diameter of second front wheel 140. As examples, the ratio of the first outer diameter to the second outer diameter may be less than 1, less than 0.9, less than 0.8, less than 0.7, less than 0.6, and/or less than 0.5. Alternatively, and as illustrated in FIG. 11, the first outer diameter of first front wheel 130 may be (at least substantially) equal to the second outer diameter of second front wheel 140.

As illustrated schematically in dashed lines in FIGS. 1 and 2, multi-wheeled vehicle 8 further may include a chassis pivot stop 150. Chassis pivot stop 150 may be configured to restrict and/or limit rotation of wheel support chassis 120 about chassis pivot axis 122, relative to steering pivot axis 112 and/or relative to body 12. As examples, chassis pivot stop 150 may be adapted, configured, designed, and/or constructed to (or to restrict rotation of the wheel support chassis to) avoid contact between wheel support chassis 120 and body 12, to avoid contact between first front wheel 130 and body 12, to avoid contact between second front wheel 140 and body 12, to maintain the first front wheel 130 forward of the second front wheel 140 (at least while in the straight, forward configuration), and/or to limit the chassis pivot angle range (as discussed further herein). The chassis pivot stop may be adapted, configured, designed, and/or constructed to restrict rotation of the wheel support chassis 120 to limit the chassis pivot angle range. For example, chassis pivot stop 150 may be configured to restrict further rotation of wheel support chassis 120 when the wheel support chassis is rotated to a threshold chassis pivot angle. Chassis pivot stop 150 may be configured to restrict and/or limit rotation of wheel support chassis 120 about chassis pivot axis 122, relative to steering pivot axis 112 and/or relative to body 12 with braking or otherwise impairing rotation of the first front wheel 130 and/or the second front wheel 140. In such an embodiment, the chassis pivot stop provides this restriction with respect to the rotation of wheel support chassis 120 without engaging the first front wheel or the second front wheel.

Figure 3:
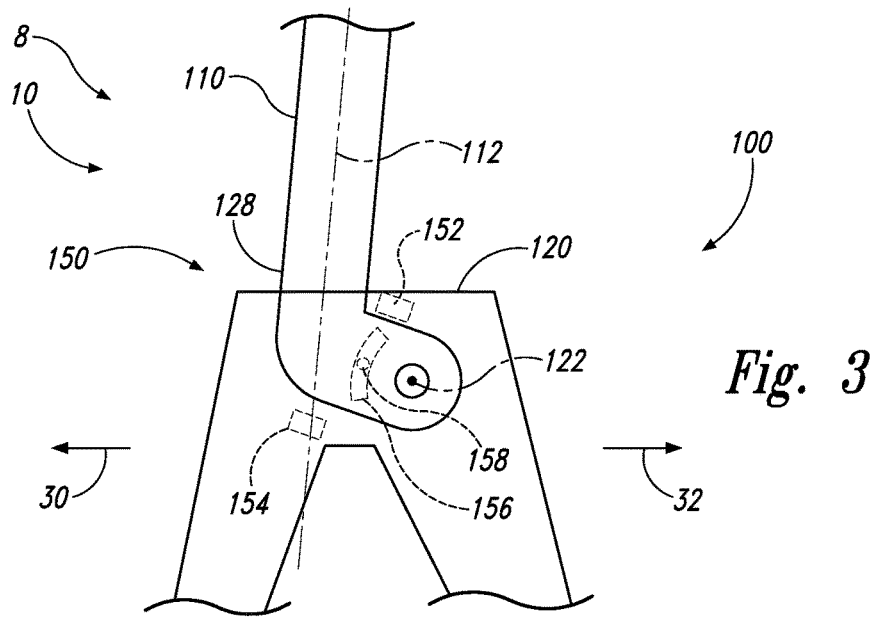
FIG. 3 is a schematic side view of a portion of a steering assembly according to the present disclosure.

Chassis pivot stop 150 may be attached to and/or form a portion of steering assembly 100 and/or body 12, as schematically illustrated in FIG. 2. FIG. 3 illustrates a steering assembly 100 that includes an example of a chassis pivot stop 150. Chassis pivot stop 150 may include any suitable structure that may be adapted, configured, designed, and/or constructed to restrict and/or limit rotation of wheel support chassis 120 about chassis pivot axis 122.

As an example, chassis pivot stop 150 may include a first stop 152 and a second stop 154. First stop 152 may be configured to restrict rotation of wheel support chassis 120 about chassis pivot axis 122 in a first direction (such as a counterclockwise direction). Second stop 154 may be configured to resist rotation of wheel support chassis 120 about chassis pivot axis 122 in a second direction that is opposed to the first direction (such as a clockwise direction). First stop 152 and second stop 154 may restrict rotation via contact with steering shaft 110.

As another example, chassis pivot stop 150 additionally or alternatively may include a track 156 and a stop 158 that translates within the track. Track 156 may be defined by one of wheel support chassis 120 and steering shaft 110 and stop 158 may be operatively attached to the other of wheel support chassis 120 and steering shaft 110.

Regardless of the exact construction, chassis pivot stop 150 may be configured to restrict a chassis pivot angle 124 (as illustrated in FIG. 4). This may include restricting chassis pivot angle 124 to a threshold chassis pivot angle range. Chassis pivot angle 124 may be defined between steering pivot axis 112 and a line that extends between first front rotational axis 132 and second front rotational axis 142.

The threshold chassis pivot angle range may be selected to avoid contact between wheel support chassis 120 and body 12, to avoid contact between first front wheel 130 and body 12, and/or to avoid contact between second front wheel 140 and body 12. The threshold chassis pivot angle range may have a lower limit of the chassis pivot angle 124 of at least 20 degrees, at least 30 degrees, at least 40 degrees, at least 50 degrees, at least 60 degrees, at least 70 degrees, at least 80 degrees, and/or at least 90 degrees. Additionally or alternatively, the threshold chassis pivot angle range may have an upper limit of the chassis pivot angle 124 of less than 200 degrees, less than 190 degrees, less than 180 degrees, less than 170 degrees, less than 160 degrees, less than 150 degrees, less than 140 degrees, less than 130 degrees, less than 120 degrees, and/or less than 110 degrees.

Returning to FIGS. 1 and 2, steering assembly 100 may include a steering pivot axis biasing mechanism 180. Steering pivot axis biasing mechanism 180 may be adapted, configured, designed, and/or constructed to provide a steering pivot axis restoring force that urges the steering assembly toward and/or to forward straight orientation 114.

As further illustrated in FIGS. 1 and 2, steering assembly 100 also may include a chassis pivot axis biasing mechanism 190. Chassis pivot axis biasing mechanism 190 may be adapted, configured, designed, and/or constructed to provide a chassis pivot axis restoring force that urges wheel support chassis 120 toward and/or to a predetermined orientation relative to steering pivot axis 112. As an example, chassis pivot biasing mechanism 190, when present, may bias, or urge, wheel support chassis 120 to a level (horizontal) orientation. In the level orientation, the lowest portions of the front wheels are oriented to both be in contact with a level (horizontal) riding surface during ground-traveling movement of the multi-wheeled vehicle 8 along the riding surface. Stated another way, the level orientation is an orientation in which a line between a first front contact point of the first front wheel 130 and a second front contact point of the second front wheel 140 is level.

As another example, chassis pivot axis biasing mechanism 190 may bias, or urge the wheel support chassis 120 into an orientation in which the first front wheel 130 is biased downward from and/or beyond a level orientation (a forward down bias) or in which the second front wheel 140 is biased downward from and/or beyond a level orientation (a rearward down bias). Additionally or alternatively, the chassis pivot axis biasing mechanism 190 may be adapted, configured, designed, and/or constructed to provide chassis pivot axis restoring forces that urge the wheel support chassis 120 toward and/or to an orientation configured to apply a predetermined weight distribution between the wheels 130 and 140. The predetermined weight distribution may be at a greater amount of the weight applied to the first front wheel 130 than to the second front wheel 140, a greater amount of the weight applied to the second front wheel 140 than to the first front wheel 130, or an about equal distribution between the first and second front wheels 130 and 140.

A forward down bias and/or more weight on the first front wheel 130 may facilitate keeping the first front wheel 130 on the riding surface and/or following the contour of the riding surface. A rearward down bias and/or more weight on the second front wheel 140 may facilitate applying more of the weight of the multi-wheeled vehicle 8 and rider to the second front wheel 140, potentially increasing the normal force on the second front wheel, the restoring torque applied by the second front wheel, and/or the lean-steering torque applied by the second front wheel.

The predetermined orientation established by the chassis pivot biasing mechanism 190 may be described by a chassis pivot angle that is at least 20 degrees, at least 30 degrees, at least 40 degrees, at least 50 degrees, at least 60 degrees, at least 70 degrees, at least 80 degrees, at least 90 degrees, less than 200 degrees, less than 190 degrees, less than 180 degrees, less than 170 degrees, less than 160 degrees, less than 150 degrees, less than 140 degrees, less than 130 degrees, less than 120 degrees, and/or less than 110 degrees.

Steering pivot axis biasing mechanism 180 and chassis pivot axis biasing mechanism 190 may include and/or be any suitable structure and/or structures. Examples of biasing mechanisms 180 and 190 include any suitable resilient member, coil spring element, torsion spring element, and/or elastomeric element. As examples, steering pivot axis biasing mechanism 180 may include an elastomeric element between the steering shaft 110 and the body 12, and chassis pivot axis biasing mechanism 190 may include an elastomeric element between the steering shaft 110 and the wheel support chassis 120. In particular, chassis pivot axis biasing mechanism 190 may be in the form of a bushing along the chassis pivot axis 122 and/or sandwiched between the wheel support chassis 120 and a base 128 (e.g., a fork, tab, or projection) of the steering shaft 110.

As schematically illustrated in FIG. 1, multi-wheeled vehicles 8 may include one or more brake assemblies 24. Brake assemblies may be configured to slow the velocity of the multi-wheeled vehicle, for example, by applying frictional forces to one or more wheels (steering wheels and/or rear wheels) and/or to the riding surface. Brake assemblies include an actuation mechanism such as brake pads and/or levers to apply force to the appropriate surface, e.g., the circumference, sidewall, and/or hub of a wheel. Brake assemblies may include a control mechanism such as a lever and/or pedal to activate the brake, and may include a transmission mechanism such as a cable and/or rod to transmit the control signal from the control mechanism to the actuation mechanism. Brake assemblies may be configured for hand and/or foot operation.

FIGS. 1-13 generally illustrate multi-wheeled vehicle 8 in the form of scooter 10; however, it is within the scope of the present disclosure that multi-wheeled vehicle 8 may include and/or be any suitable multi-wheeled vehicle that may include steering assemblies 100. Examples of multi-wheeled vehicles 8 according to the present disclosure include a skateboard that includes steering assembly 100, an articulated skateboard that includes steering assembly 100, a bicycle that includes steering assembly 100, and/or a tricycle that includes steering assembly 100. Additional examples of multi-wheeled vehicles 8, of scooters 10, and/or of components of scooters 10 that may be included in and/or utilized with multi-wheeled vehicles 8 according to the present disclosure and/or with steering assemblies 100 of multi-wheeled vehicles 8 are disclosed in U.S. Patent Application Publication Nos. 2007/0182123, 2013/0001909, and 2007/0235970. The complete disclosures of these patent documents are hereby incorporated by reference.

FIG. 4 is a schematic side view of a portion of a multi-wheeled vehicle 8 and a steering assembly 100 according to the present disclosure. In FIG. 4, multi-wheeled vehicle 8 may be described as being in a neutral orientation 118. In the neutral orientation, steering assembly 100 may be in forward straight orientation 114, and multi-wheeled vehicle 8 may be in an upright orientation (and/or may not be leaning or otherwise tilted to the side) on a planar riding surface 40 such that first front wheel 130 forms a first front contact point 134 with the planar riding surface, and second front wheel 140 forms a second front contact point 144 with the planar riding surface. Although not illustrated in FIG. 4, it should be understood that the multi-wheeled vehicle's rear wheel forms a rear contact point with the planar riding surface.

When multi-wheeled vehicle 8 is in neutral orientation 118, a first mounting offset distance 170 may be defined as a minimum distance between chassis pivot axis 122 and a first plane 171 that extends perpendicular to planar riding surface 40 and parallel to first front rotational axis 132. Similarly, a second mounting offset distance 172 may be defined as a minimum distance between chassis pivot axis 122 and a second plane 173 that extends perpendicular to planar riding surface 40 and parallel to second front rotational axis 142. The chassis pivot axis 122 is located between the first plane 171 and the second plane 173. Stated in another manner, the first mounting offset distance 170 and the second mounting offset distance 172 are measured (located) on opposite sides of the chassis pivot axis 122.

When in use with the wheels 130 and 140 in contact with the riding surface, at least a portion of the weight of the multi-wheeled vehicle 8 and the supported rider is applied to the steering assembly and schematically indicated as steering weight force 126. The steering weight force 126 is distributed to the wheels 130 and 140 by the wheel support chassis 120. The wheel support chassis operatively retains first front wheel 130 and second front wheel 140 such that a first normal force 136 (between riding surface 40 and first front wheel 130) and a second normal force 146 (between riding surface 40 and second front wheel 140) substantially, and/or entirely, balance the steering weight force 126. The wheel support chassis 120, the first front wheel 130, and the second front wheel 140 may be arranged to distribute the steering weight force 126 equally, or at least substantially equally, between the wheels 130 and 140, mostly to the first front wheel 130, and/or mostly to the second front wheel 140. Therefore, the first normal force 136 may be greater than, less than, or about equal to the second normal force 146. A greater first normal force 136 may facilitate the first front wheel 130 following the contour of the riding surface. A greater second normal force 146 may generate a greater net restoring torque (i.e., more restoring torque applied by the second front wheel 140) and/or a greater lean-steer responsiveness (i.e., more lean-steering torque applied by the second front wheel 140). Arranging a greater normal force over the front wheel (130 or 140) that has the larger diameter may facilitate rolling over obstacles. For example, the wheel support chassis 120 may be configured to apply a greater normal force 136 (as compared to normal force 146) in embodiments where the first front wheel 130 has a larger diameter than the second front wheel 140.

The unequal distribution of the normal forces 136 and 146 may be accomplished, for example, by retaining first front wheel 130 and second front wheel 140 such that first mounting offset distance 170 is greater than, less than, or about equal to second mounting offset distance 172. As examples, a ratio of the second mounting offset distance to the first mounting offset distance may be at least 0.6, at least 0.8, about 1, at least 1, at least 1.1, at least 1.15, at least 1.2, at least 1.25, at least 1.3, at least 1.35, at least 1.4, at least 1.45, and/or at least 1.5. Additionally or alternatively, the ratio of the second mounting offset distance to the first mounting offset distance also may be less than 2, less than 1.9, less than 1.8, less than 1.7, less than 1.6, less than 1.5, less than 1.4, less than 1.3, less than 1.2, less than 1.1, and/or less than 1.

When multi-wheeled vehicle 8 is in neutral orientation 118, a first ground contact distance 160 may be defined as a minimum distance between first front contact point 134 and steering pivot axis 112. Similarly, a second ground contact distance 162 may be defined as a minimum distance between second front contact point 144 and steering pivot axis 112. It is within the scope of the present disclosure that first ground contact distance 160 and second ground contact distance 162 may be measured on opposed sides of an intersection 113 of steering pivot axis 112 with the planar riding surface, as illustrated in FIG. 4. For example, the first ground contact distance 160 may be located forward of the intersection 113, and the second ground contact distance 162 may be located rearward of the intersection 113. However, it is also within the scope of the present disclosure that the first ground contact distance and the second ground contact distance may be measured on the same side of intersection 113 (e.g., both located rearward of the intersection 113, as illustrated in FIG. 13). Under these conditions, the first ground contact distance and the second ground contact distance generally will be measured in a rearward direction 32 from intersection 113.

FIGS. 5-8 provide additional schematic views of a multi-wheeled vehicle 8, in the form of a scooter 10, that includes a steering assembly 100 according to the present disclosure. Multi-wheeled vehicle 8 of FIGS. 5-8 may include any of the structures and/or features that are discussed herein with reference to FIGS. 1-4 or even may be multi-wheeled vehicle 8 of FIGS. 1-4. Similarly, multi-wheeled vehicle 8 of FIGS. 1-4 may include any of the structures and/or features that are discussed herein with reference to FIGS. 5-8.

Figure 5:
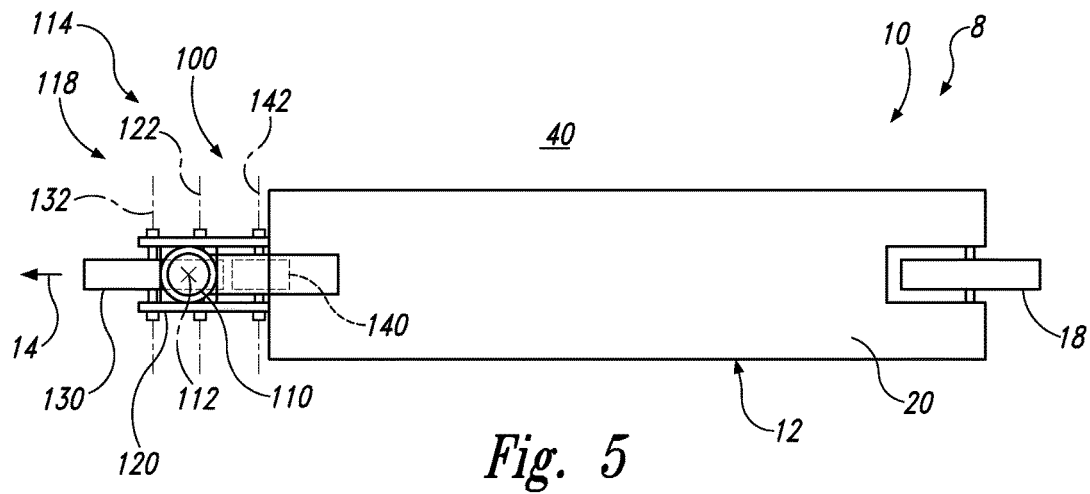
FIG. 5 is a schematic view of a scooter that includes a steering assembly according to the present disclosure as viewed down a steering pivot axis of the scooter.
Figure 6:
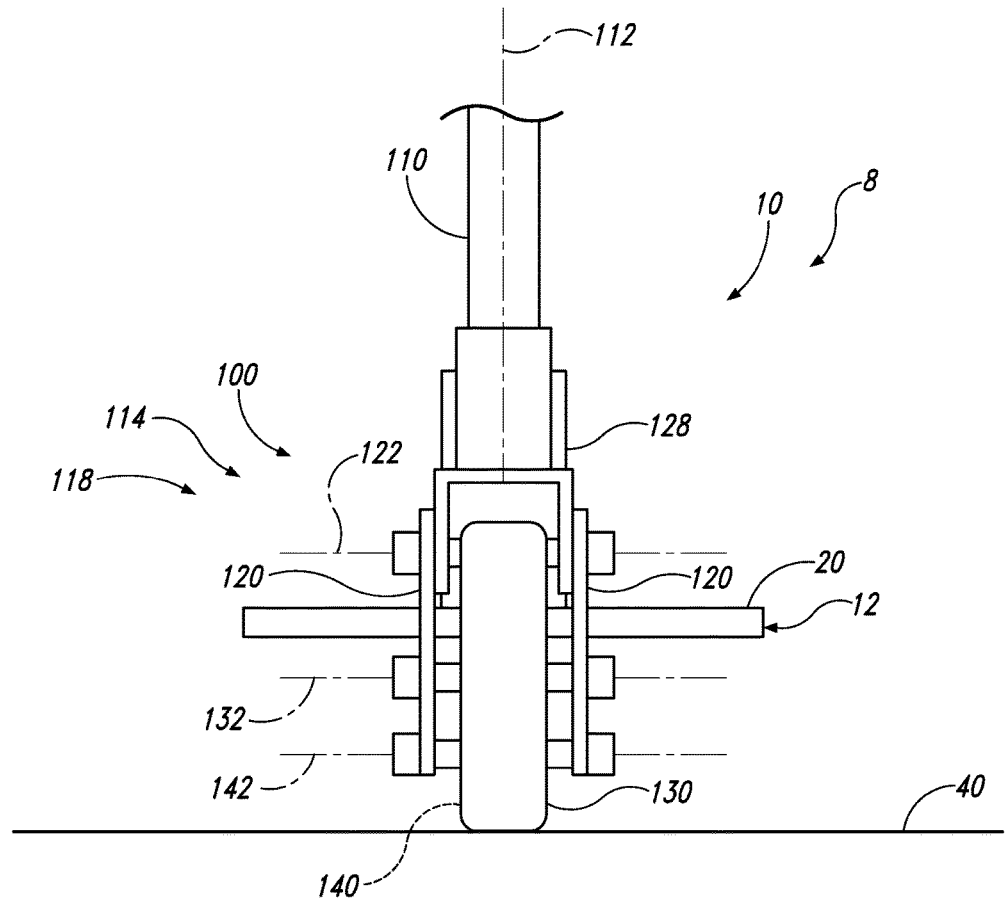
FIG. 6 is a schematic view of the scooter of FIG. 5 as viewed from a direction of travel of the scooter.

FIG. 5 is a schematic view of multi-wheeled vehicle 8 as viewed down (or from) a steering pivot axis 112 thereof, while FIG. 6 is a schematic view of the multi-wheeled vehicle of FIG. 5 as viewed from the indicated direction of travel 14 of the multi-wheeled vehicle. FIG. 7 is a schematic view of multi-wheeled vehicle 8 as viewed down (or from) a steering pivot axis 112 thereof, while FIG. 8 is a schematic view of the multi-wheeled vehicle of FIG. 7 as viewed from the indicated direction of travel 14 of the multi-wheeled vehicle. In FIGS. 6 and 8, only a front portion of multi-wheeled vehicle 8 is illustrated. More specifically, and for simplicity of illustration, FIGS. 6 and 8 do not illustrate all of the body 12 of multi-wheeled vehicle 8 that defines a rider platform 20 thereof. In addition, FIGS. 6 and 8 do not illustrate rear wheel(s) 18 of multi-wheeled vehicle 8.

Similar to multi-wheeled vehicle 8 of FIGS. 1-4, steering assembly 100 of FIGS. 5-8 includes steering shaft 110, wheel support chassis 120, and chassis pivot axis 122. In addition, steering assembly 100 of FIGS. 5-8 also includes first front wheel 130, which is configured to rotate about first front rotational axis 132, and second front wheel 140, which is configured to rotate about second front rotational axis 142. First and second rotational axes 132 and 142 are parallel to each other, with first rotational axis 132 extending forward (i.e., farther away from rear wheel 18) of second rotational steering axis 142.

In FIGS. 5-6, multi-wheeled vehicle 8 is illustrated in a neutral orientation 118, with steering assembly 100 in a forward straight orientation 114 and multi-wheeled vehicle 8 in an upright orientation (i.e., not leaning to the side). Stated another way, a transverse cross-section of body 12 and/or rider platform 20 thereof is (at least substantially) parallel to a planar riding surface 40 upon which multi-wheeled vehicle 8 is resting (as illustrated in FIG. 5). Stated still another way, a lean angle of multi-wheeled vehicle 8 is (at least substantially) zero degrees. Under these conditions, first front wheel 130, second front wheel 140, and rear wheel 18 (when a single rear wheel 18 is utilized) are (at least substantially) inline with one another, and multi-wheeled vehicle 8 is configured to be conveyed on a (or an at least substantially) straight trajectory, or direction of travel, across the riding surface.

As discussed, multi-wheeled vehicle 8 may be turned, or steered, in several different manners. As an example, and as discussed, steering shaft 110 may be rotated about its axis to turn the multi-wheeled vehicle. FIG. 7 illustrates an example of such a steering method, with steering assembly 100 being illustrated in a turning orientation 116 that is aligned along the (possibly new) direction of travel 14. In the illustrated turning orientation 116, the steering assembly is oriented at a turn angle 102 relative to the forward straight orientation 114 of FIG. 5. The steering orientation (straight or turned) produced by rider inputs to the steering assembly 100 may be referred to as a steering-induced steering orientation (straight or turned). Under these conditions, multi-wheeled vehicle 8 may be retained in the upright orientation; however, and as discussed in more detail herein with reference to FIG. 9, a combination of the lateral frictional forces between first front wheel 130 and riding surface 40, and the lateral frictional forces between second front wheel 140 and riding surface 40, will produce a net torque (i.e., a restoring torque) that will urge steering assembly 100 back toward forward straight orientation 114 of FIG. 5 (or toward the lean-induced steering orientation as discussed further herein). To steer the multi-wheeled vehicle 8 with the steering assembly 100, the rider needs to apply a force and/or a torque to the steering assembly 100 to overcome the restoring torque.

As another example, multi-wheeled vehicle 8 may be leaned to the side to transition steering assembly 100 to turning orientation 116 of FIG. 7. The steering orientation (straight or turned) produced by leaning may be referred to as a lean-induced steering orientation (straight or turned). The leaning, or tilting, may be caused by the rider leaning on the rider platform and/or by the rider pushing (without rotating) the steering assembly's handlebar in a sideways direction (e.g., downward left or right). This is illustrated by FIG. 8. Therein, leaning multi-wheeled vehicle 8 to a given lean angle 22 (or amount of lean 22) between rider platform 20 and riding surface 40 produces a given, or selected, turn angle 102 (as illustrated in FIG. 7) about steering pivot axis 112. As shown in FIG. 8, the lean angle 22 is the angle between the rider platform 20 and the underlying riding surface 40. At a lean angle of zero (i.e., no lean), the rider platform 20 is in a plane parallel to the riding surface 40, as indicated by the horizontal broken line.

As discussed, the magnitude of turn angle 102 may be varied and/or selected by varying lean angle 22, thereby permitting lean steer of multi-wheeled vehicle 8; and the net torque (i.e., lean steering torque) produced by the lateral frictional forces between first front wheel 130 and riding surface 40 and the lateral frictional forces between second front wheel 140 and riding surface 40 will urge steering assembly 100 toward the turn angle 102 (also referred to as the lean-induced turn angle) determined by the lean angle 22 and the corresponding lean-induced steering orientation. Additionally, if the steering assembly is perturbed from this lean-induced turn angle, the net torque (i.e., restoring torque) produced by lateral frictional forces between the wheels 130, 140 and the riding surface will urge the steering assembly back toward lean-induced turn angle 102.

As discussed herein, wheel support chassis 120 may operatively retain first front wheel 130 and second front wheel 140 such that a net torque generated between steering assembly 100 and riding surface 40 due to lateral frictional forces therebetween urges the steering assembly toward forward straight orientation 114 when multi-wheeled vehicle 8 is conveyed across riding surface 40 and is in neutral orientation 118 (as illustrated in FIGS. 5-6) and urges the steering assembly toward the selected turn angle 102 when the multi-wheeled vehicle is conveyed across riding surface 40 and has a non-zero lean angle 22 (as illustrated in FIGS. 7-8). The selected turn angle is (substantially) zero degrees when the lean angle is (substantially) zero degrees and increases in magnitude with increases in the magnitude of the lean angle. The desired net torque may be a sum of a first torque about steering pivot axis 112 and a second torque about steering pivot axis 112 and/or may be generated by retaining first front wheel 130 and second front wheel 140 such that the first torque is less than the second torque.

Thus, when the rider produces a lean angle 22, the net torque (turning torque) between the front wheels and the ground surface induce a lean-induced turn angle to the steering assembly (and a lean-induced steering orientation). If the lean angle is zero, the lean-induced turn angle is likewise zero (forward straight orientation of the steering assembly). The lean-induced steering orientation associated with a zero lean angle and a zero lean-induced turn angle is the forward straight orientation. While the multi-wheeled vehicle is travelling along a direction of travel (as determined by the lean angle and the consequent lean-induced turn angle), perturbations of the steering assembly from the lean-induced turn angle cause net torques (restoring torques) between the front wheels and the ground surface to redirect the steering assembly back toward the lean-induced turn angle and the lean-induced steering orientation.

FIGS. 9-13 provide additional examples of multi-wheeled vehicles 8 including steering assemblies 100 and/or components thereof that are within the scope of the present disclosure. It is within the scope of the present disclosure that any of the structures, components, and/or features that are described herein with reference to any of FIGS. 9-13 may be included and/or utilized in multi-wheeled vehicles 8 and/or steering assemblies 100 of FIGS. 1-8. Similarly, it is also within the scope of the present disclosure that any of the structures, components, and/or features that are described herein with reference to any of FIGS. 1-8 may be included and/or utilized in multi-wheeled vehicles 8 and/or steering assemblies 100 of FIGS. 9-13.

Figure 9:
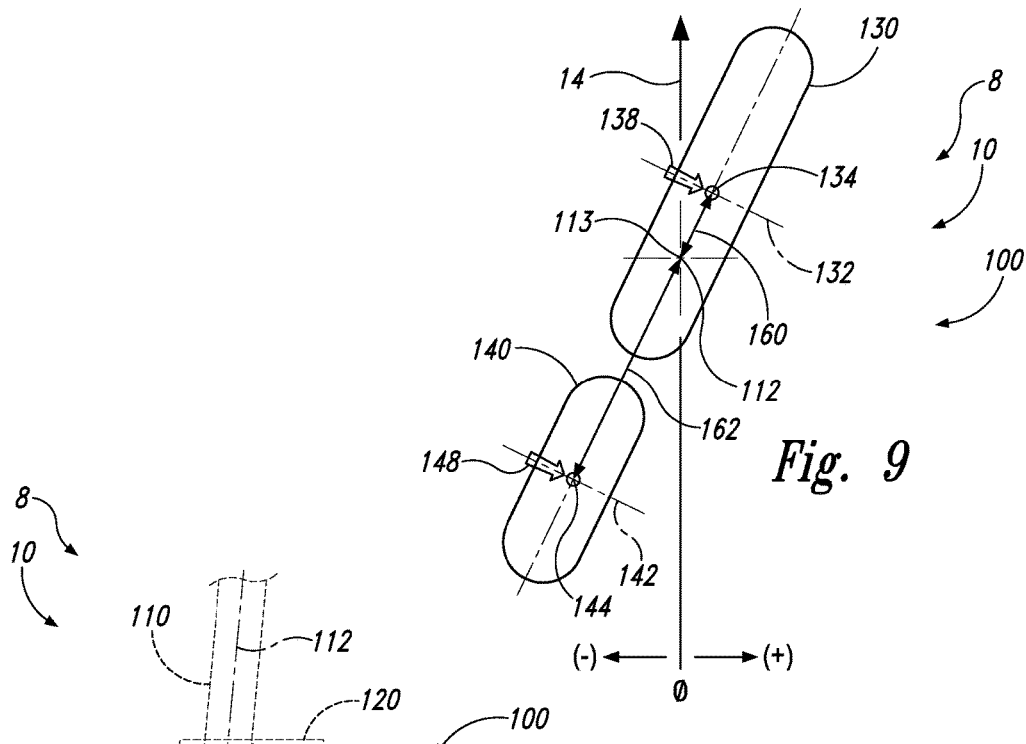
FIG. 9 is a schematic view of a portion of a steering assembly according to the present disclosure as viewed down a steering axis of the steering assembly.

FIG. 9 schematically illustrates the lower portion of steering assembly 100 when the steering assembly is perturbed from the direction of travel 14. As illustrated in FIG. 9, disturbing and/or perturbing steering assembly 100 from the selected turn angle (i.e., turning the steering assembly such that first front wheel 130 and second front wheel 140 are not inline with, or rolling in a direction that is parallel to, the direction of travel 14 of multi-wheeled vehicle 8) may cause lateral frictional forces 138 and 148 to be exerted on first front wheel 130 and on second front wheel 140, respectively. The first torque may be a product of (or proportional to the product of) first lateral frictional force 138 and first ground contact distance 160. The second torque may be a product of (or proportional to the product of) second lateral frictional force 148 and second ground contact distance 162. First lateral frictional force 138 and second lateral frictional force 148 may be generated by frictional drag forces on first front wheel 130 and second front wheel 140, respectively, due to the fact that first front wheel 130 and second front wheel 140 are not aligned with direction of travel 14. The lateral frictional forces 138 and 148 generally are proportional to, or at least related to, the respective normal forces 136 and 146 (as shown in FIG. 4).

First ground contact distance 160 and second ground contact distance 162 are arranged such that the first torque is less than the second torque. First ground contact distance 160 generally is about equal to or less than second ground contact distance 162. As examples, a ratio of the first ground contact distance to the second ground contact distance may be less than 1.2, less than 1.1, about 1, less than 1, less than 0.9, less than 0.8, less than 0.7, less than 0.6, less than 0.5, less than 0.4, less than 0.3, and/or less than 0.2. Additionally or alternatively, the ratio of the first ground contact distance to the second ground contact distance may be at least 0.05, at least 0.1, at least 0.15, at least 0.2, at least 0.25, at least 0.3, at least 0.35, at least 0.4, at least 0.45, at least 0.5, at least 0.6, at least 0.7, at least 0.8, at least 0.9, and/or at least 1. Additionally or alternatively, first lateral frictional force 138 may be less than second lateral frictional force 148.

If the rider were to lean steer the multi-wheeled vehicle (e.g., by leaning the platform or pivoting the steering shaft), the lateral frictional forces 138 and 148 would be applied to the opposite side of the respective wheels 130 and 140 as that shown in FIG. 9. The net torque due to the lateral frictional forces 138 and 148 due to lean-steering provides a turning torque that causes the steering assembly to orient in the direction of travel (and/or turn angle) substantially determined by the lean angle, as discussed with respect to FIGS. 7 and 8.

FIG. 10 illustrates a steering assembly 100 in which first front wheel 130 is smaller than (or has a smaller relative diameter than) second front wheel 140. FIG. 11 illustrates a steering assembly 100 in which first front wheel 130 and second front wheel 140 have (at least substantially) similar, or even the same, diameters.

FIG. 12 illustrates a steering assembly 100 in which steering pivot axis 112 (at least substantially) intersects first front rotational axis 132. FIG. 13 illustrates a steering assembly 100 in which steering pivot axis 112 is located forward of (or is in a forward direction 30 from) first front rotational axis 132.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, and/or embodiments according to the present disclosure, are intended to convey that the described component, feature, detail, structure, and/embodiment is an illustrative, non-exclusive example of components, features, details, structures, and/or embodiments according to the present disclosure. Thus, the described component, feature, detail, structure, and/or embodiment is not intended to be limiting, required, or exclusive/exhaustive; and other components, features, details, structures, and/or embodiments, including structurally and/or functionally similar and/or equivalent components, features, details, structures, and/or embodiments, are also within the scope of the present disclosure.

Illustrative, non-exclusive examples of multi-wheeled vehicles and steering assemblies according to the present disclosure are presented in the following enumerated paragraphs.

A1. A scooter, comprising:
a body configured to support a rider;
a rear wheel rotatingly coupled to the body; and
a steering assembly that includes:
(i) a steering shaft rotationally coupled to the body about a steering pivot axis and configured to permit rotation of the steering assembly about the steering pivot axis among a plurality of steering orientations that includes at least a forward straight orientation, in which the steering assembly is oriented to direct the scooter on a (substantially) straight, forward trajectory, and a turning orientation, in which the steering assembly is oriented to direct the scooter on a curved trajectory;
(ii) a wheel support chassis pivotally coupled to the steering shaft about a chassis pivot axis;
(iii) a first front wheel rotatingly coupled to the wheel support chassis about a first front rotational axis; and
(iv) a second front wheel rotatingly coupled to the wheel support chassis about a second front rotational axis, wherein the second front wheel is (at least substantially) inline with the first front wheel and located closer to the rear wheel than the first front wheel when the steering shaft is in the forward straight orientation.

A2. The scooter of paragraph A1, wherein the wheel support chassis operatively retains the first front wheel and the second front wheel relative to the steering pivot axis such that, when the steering assembly is in the turning orientation and the scooter is being propelled across a riding surface by the rider, a net torque generated between the steering assembly and the riding surface urges the steering assembly toward the forward straight orientation.

A3. The scooter of any of paragraphs A1-A2, wherein the wheel support chassis operatively retains the first front wheel and the second front wheel relative to the steering pivot axis such that, when the scooter is being propelled across a/the riding surface by the rider and the rider leans in a turning direction such that the scooter is in a leaning orientation, a net torque generated between the steering assembly and the riding surface urges the steering assembly in the turning direction, optionally wherein the net torque urges the steering assembly to a given steering orientation that is a function of a magnitude of lean of the scooter, and further optionally wherein the net torque resists motion of the steering assembly away from the given steering orientation.

A4. The scooter of any of paragraphs A2-A3, wherein the net torque generated between the steering assembly and the riding surface includes:
(i) a first torque about the steering pivot axis, wherein the first torque is generated by a first frictional force between the first front wheel and the riding surface; and
(ii) a second torque about the steering pivot axis, wherein the second torque is generated by a second frictional force between the second front wheel and the riding surface.

A5. The scooter of paragraph A4, wherein the wheel support chassis operatively retains the first front wheel and the second front wheel relative to the steering pivot axis such that the second torque is greater than the first torque.

A6. The scooter of any of paragraphs A1-A5, wherein the wheel support chassis operatively retains the first front wheel and the second front wheel relative to the steering pivot axis such that, when the rider is being supported by the body, a first normal force between the first front wheel and a/the riding surface is greater than a second normal force between the second front wheel and the riding surface.

A7. The scooter of any of paragraphs A1-A6, wherein the chassis pivot axis is (at least substantially) perpendicular to the steering pivot axis.

A8. The scooter of any of paragraphs A1-A7, wherein the wheel support chassis maintains a location of the first front rotational axis fixed relative to a location of the second front rotational axis.

A9. The scooter of any of paragraphs A1-A8, wherein the wheel support chassis maintains the first front rotational axis, the second front rotational axis, and the chassis pivot axis (at least substantially) parallel to one another.

A10. The scooter of any of paragraphs A1-A9, wherein the first front rotational axis is at least one of:
(i) forward of the steering pivot axis;
(ii) (at least substantially) intersected by the steering pivot axis; and
(iii) rearward of the steering pivot axis.

A11. The scooter of any of paragraphs A1-A10, wherein the second front rotational axis is rearward of the steering pivot axis.

A12. The scooter of any of paragraphs A1-A11, wherein the scooter defines a neutral orientation when the steering assembly is in the forward straight orientation and the scooter is in an upright orientation on a planar riding surface and wherein in the neutral orientation, the first front wheel forms a first front contact point with the planar riding surface, the second front wheel forms a second front contact point with the planar riding surface, and the rear wheel forms a rear contact point with the planar riding surface.

A13. The scooter of paragraph A12, wherein, when the scooter is in the neutral orientation:
(i) a first ground contact distance is defined as a minimum distance between the first front contact point and the steering pivot axis; and
(ii) a second ground contact distance is defined as a minimum distance between the second front contact point and the steering pivot axis.

A14. The scooter of paragraph A13, wherein the first ground contact distance is less than the second ground contact distance.

A15. The scooter of any of paragraphs A13-A14, wherein a ratio of the first ground contact distance to the second ground contact distance is at least one of:
(i) less than 1.2, less than 1.1, about 1, less than 1, less than 0.9, less than 0.8, less than 0.7, less than 0.6, less than 0.5, less than 0.4, less than 0.3, or less than 0.2; and
(ii) at least 0.05, at least 0.1, at least 0.15, at least 0.2, at least 0.25, at least 0.3, at least 0.35, at least 0.4, at least 0.45, at least 0.5, at least 0.6, at least 0.7, at least 0.8, at least 0.9, or at least 1.

A16. The scooter of any of paragraphs A13-A15, wherein the first ground contact distance and the second ground contact distance are at least one of:
(i) measured on opposed sides of the steering pivot axis; and
(ii) measured on the same side of the steering pivot axis.

A17. The scooter of any of paragraphs A12-A16, wherein, when the scooter is in the neutral orientation:
(i) a first mounting offset distance is defined as a minimum distance between the chassis pivot axis and a first plane that extends perpendicular to the planar riding surface and parallel to the first front rotational axis; and
(ii) a second mounting offset distance is defined as a minimum distance between the chassis pivot axis and a second plane that extends perpendicular to the planar riding surface and parallel to the second front rotational axis.

A18. The scooter of paragraph A17, wherein the first mounting offset distance is at least one of different than, less than, greater than, or equal to the second mounting offset distance.

A19. The scooter of any of paragraphs A17-A18, wherein a ratio of the second mounting offset distance to the first mounting offset distance is at least one of:
(i) at least 0.6, at least 0.8, about 1, at least 1, at least 1.1, at least 1.15, at least 1.2, at least 1.25, at least 1.3, at least 1.35, at least 1.4, at least 1.45, or at least 1.5; and
(ii) less than 2, less than 1.9, less than 1.8, less than 1.7, less than 1.6, less than 1.5, less than 1.4, less than 1.3, less than 1.2, less than 1.1, and/or less than 1.

A20. The scooter of any of paragraphs A17-A19, wherein the first mounting offset distance and the second mounting offset distance are measured on opposed sides of the chassis pivot axis.

A21. The scooter of any of paragraphs A1-A20, wherein a first outer diameter of the first front wheel is greater than a second outer diameter of the second front wheel.

A22. The scooter of paragraph A21, wherein a ratio of the first outer diameter to the second outer diameter is at least 1.1, at least 1.2, at least 1.3, at least 1.4, at least 1.5, at least 1.6, at least 1.7, at least 1.8, at least 1.9, or at least 2.0.

A23. The scooter of any of paragraphs A1-A20, wherein a first outer diameter of the first front wheel is (at least substantially) equal to a second outer diameter of the second front wheel.

A24. The scooter of any of paragraphs A1-A20, wherein a first outer diameter of the first front wheel is less than a second outer diameter of the second front wheel.

A25. The scooter of paragraph A24, wherein a ratio of the first outer diameter to the second outer diameter is less than 1, less than 0.9, less than 0.8, less than 0.7, less than 0.6, or less than 0.5.

A26. The scooter of any of paragraphs A1-A25, wherein the steering assembly further includes a chassis pivot stop configured to restrict rotation of the wheel support chassis about the chassis pivot axis, optionally to within a threshold chassis pivot angle range.

A27. The scooter of paragraph A26, wherein the chassis pivot stop includes a first stop, which is configured to restrict rotation of the wheel support chassis about the chassis pivot axis in a first direction, and a second stop, which is configured to restrict rotation of the wheel support chassis about the chassis pivot axis in a second direction that is opposed to the first direction.

A28. The scooter of any of paragraphs A26-A27, wherein the chassis pivot stop includes a track and a stop that translates within the track.

A29. The scooter of any of paragraphs A26-A28, wherein the chassis pivot stop is configured to at least one of:
(i) avoid contact between the wheel support chassis and the body;
(ii) avoid contact between the first front wheel and the body; and
(iii) avoid contact between the second front wheel and the body.

A30. The scooter of any of paragraphs A26-A29, wherein the chassis pivot stop is configured to restrict a chassis pivot angle, which is defined between the steering pivot axis and a line that extends between the first front rotational axis and the second front rotational axis, to the threshold chassis pivot angle range.

A31. The scooter of paragraph A30, wherein the threshold chassis pivot angle range is selected to at least one of:

(i) avoid contact between the wheel support chassis and the body;

(ii) avoid contact between the first front wheel and the body; and (iii) avoid contact between the second front wheel and the body.

A32. The scooter of any of paragraphs A30-A31, wherein the threshold chassis pivot angle range has a lower limit of at least 20 degrees, at least 30 degrees, at least 40 degrees, at least 50 degrees, at least 60 degrees, at least 70 degrees, at least 80 degrees, or at least 90 degrees.

A33. The scooter of any of paragraphs A30-A32, wherein the threshold chassis pivot angle range has an upper limit of less than 200 degrees, less than 190 degrees, less than 180 degrees, less than 170 degrees, less than 160 degrees, less than 150 degrees, less than 140 degrees, less than 130 degrees, less than 120 degrees, or less than 110 degrees.

A34. The scooter of any of paragraphs A26-A33, wherein the chassis pivot stop is configured to permit rotation of the first front wheel about the first front rotational axis and rotation of the second front wheel about the second front rotational axis when the chassis pivot stop is engaged to restrict rotation of the wheel support chassis about the chassis pivot axis.

A35. The scooter of any of paragraphs A1-A34, wherein the steering assembly further includes a steering pivot axis biasing mechanism configured to provide a steering pivot axis restoring force that urges the steering assembly toward the forward straight orientation.

A36. The scooter of any of paragraphs A1-A35, wherein the steering assembly further includes a chassis pivot axis biasing mechanism configured to provide a chassis pivot axis restoring force that urges the wheel support chassis toward a predetermined orientation relative to the steering pivot axis.

A37. The scooter of paragraph A36, wherein the predetermined orientation is a chassis pivot angle that is at least 20 degrees, at least 30 degrees, at least 40 degrees, at least 50 degrees, at least 60 degrees, at least 70 degrees, at least 80 degrees, at least 90 degrees, less than 200 degrees, less than 190 degrees, less than 180 degrees, less than 170 degrees, less than 160 degrees, less than 150 degrees, less than 140 degrees, less than 130 degrees, less than 120 degrees, and/or less than 110 degrees, wherein the chassis pivot angle is defined between the steering pivot axis and a line that extends between the first front rotational axis and the second front rotational axis.

A38. The scooter of any of paragraphs A36-A37, wherein the predetermined orientation is one of:

(i) a level orientation in which a line between a first front contact point of the first front wheel and a second front contact point of the second front wheel is level;

(ii) a rearward down orientation in which a line from the first front contact point of the first front wheel and the second front contact point of the second front wheel is sloped downward; and (iii) a forward down orientation in which a line from the second front contact point of the second front wheel and the first front contact point of the first front wheel is sloped downward.

A39. The scooter of any of paragraphs A1-A38, wherein the rear wheel is inline with the first front wheel and with the second front wheel when the steering assembly is in the forward straight orientation.

A40. The scooter of any of paragraphs A1-A38, wherein the rear wheel is out of line with at least one of the first front wheel and the second front wheel when the steering assembly is in the forward straight orientation.

A41. The scooter of any of paragraphs A1-A38, wherein the rear wheel is a first rear wheel, and further wherein the scooter includes a second rear wheel.

A42. The scooter of paragraph A41, wherein the first rear wheel and the second rear wheel are mounted on a truck.

A43. The scooter of any of paragraphs A1-A42, wherein the body includes a rider platform having an upper surface configured for the rider to stand on with one foot while contacting a/the riding surface with the rider's other foot.

A44. The scooter of paragraph A43, wherein the steering pivot axis projects from the steering assembly upwardly and divergently away from the rider platform.

A45. The scooter of any of paragraphs A43-A44, wherein the scooter is configured to be steered by the rider in the following manners:

by the rider leaning to the left or right on the upper surface of the rider platform;

by the rider pivoting the steering shaft to the left or right relative to the riding surface; and by the rider rotating the steering shaft relative to the body about the steering pivot axis.

A46. The scooter of any of paragraphs A43-A45, wherein the upper surface of the rider platform extends at least partially between the first front wheel and the rear wheel.

A47. The scooter of any of paragraphs A1-A46, wherein the wheel support chassis operatively retains the first front wheel and the second front wheel relative to the steering pivot axis such that, when the scooter is being propelled across a/the riding surface by the rider and the rider imparts a lean angle to the scooter, a net torque generated between the steering assembly and the riding surface urges the steering assembly into a lean-induced steering orientation, optionally wherein the lean-induced steering orientation is a function of a magnitude of lean angle of the scooter, and further optionally wherein the net torque resists motion of the steering assembly away from the lean-induced steering orientation.

A48. The scooter of any of paragraphs A1-A47, wherein the wheel support chassis operatively retains the first front wheel and the second front wheel relative to the steering pivot axis such that, when the scooter is being propelled across a/the riding surface by the rider and the steering assembly is perturbed from a lean-induced steering orientation, a net restoring torque generated between the steering assembly and the riding surface urges the steering assembly toward the lean-induced steering orientation.

A49. Any of paragraphs A1-A48, wherein instead of a "scooter," the paragraph(s) recite(s) a "multi-wheeled vehicle."

INDUSTRIAL APPLICABILITY

The steering assemblies and multi-wheeled vehicles disclosed herein are applicable to the sporting, recreational vehicle, and rider-propelled vehicle fields.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A scooter, comprising:
   a body configured to support a rider;
   a rear wheel rotatingly coupled to the body;
   a steering assembly that includes:
   (i) a steering shaft rotationally coupled to the body about a steering pivot axis and configured to permit rotation of the steering assembly about the steering pivot axis among a plurality of steering orientations that includes at least a forward straight orientation, in which the steering assembly is oriented to direct the scooter on a straight, forward trajectory, and a turning orientation, in which the steering assembly is oriented to direct the scooter on a curved trajectory;
   (ii) a wheel support chassis pivotally coupled to the steering shaft for rotation about a chassis pivot axis;
   (iii) a first front wheel rotatingly coupled to the wheel support chassis about a first front rotational axis; and
   (iv) a second front wheel rotatingly coupled to the wheel support chassis about a second front rotational axis, wherein the second front wheel is at least substantially inline with the first front wheel such that a line that extends perpendicular to the first and second front rotational axes intersects the first and second front wheels, and further wherein the second front wheel is located closer to the rear wheel than the first front wheel when the steering shaft is in the forward straight orientation;
   wherein the scooter defines a neutral orientation when the steering assembly is in the forward straight orientation and the scooter is in an upright orientation on a planar riding surface;
   wherein in the neutral orientation, the first front wheel forms a first front contact point with the planar riding surface, the second front wheel forms a second front contact point with the planar riding surface, and the rear wheel forms a rear contact point with the planar riding surface;
   wherein, when the scooter is in the neutral orientation:
   (i) a first ground contact distance is defined as a minimum distance between the first front contact point and the steering pivot axis;
   (ii) a second ground contact distance is defined as a minimum distance between the second front contact point and the steering pivot axis;
   wherein the first ground contact distance is less than the second ground contact distance; and
   wherein the scooter further includes a chassis pivot stop configured to restrict rotation of the wheel support chassis about the chassis pivot axis to within a chassis pivot angle range.

2. The scooter of claim 1, wherein the chassis pivot stop is configured to permit rotation of the first front wheel about the first front rotational axis and rotation of the second front wheel about the second front rotational axis when the chassis pivot stop is engaged to restrict rotation of the wheel support chassis about the chassis pivot axis.

3. The scooter of claim 1, wherein the steering assembly includes the chassis pivot stop.

4. The scooter of claim 1, wherein a first outer diameter of the first front wheel is greater than a second outer diameter of the second front wheel.

5. The scooter of claim 1, wherein the wheel support chassis operatively retains the first front wheel and the second front wheel relative to the steering pivot axis such that, when the rider is being supported by the body, a first normal force between the first front wheel and a riding surface is greater than a second normal force between the second front wheel and the riding surface.

6. The scooter of claim 1, wherein the first front contact point is forward of a point where the steering pivot axis intersects the planar riding surface, and the second front contact point is rearward of the point where the steering pivot axis intersects the planar riding surface.

7. The scooter of claim 1, wherein, when the scooter is in the neutral orientation:
   (i) a first mounting offset distance is defined as a minimum distance between the chassis pivot axis and a first plane that extends perpendicular to the planar riding surface and parallel to the first front rotational axis; and
   (ii) a second mounting offset distance is defined as a minimum distance between the chassis pivot axis and a second plane that extends perpendicular to the planar riding surface and parallel to the second front rotational axis;
   wherein the first mounting offset distance is less than the second mounting offset distance.

8. The scooter of claim 1, wherein, when the scooter is in the neutral orientation:
   (i) a first mounting offset distance is defined as a minimum distance between the chassis pivot axis and a first plane that extends perpendicular to the planar riding surface and parallel to the first front rotational axis; and
   (ii) a second mounting offset distance is defined as a minimum distance between the chassis pivot axis and a second plane that extends perpendicular to the planar riding surface and parallel to the second front rotational axis;
   wherein the first plane is forward of the chassis pivot axis and the second plane is rearward of the chassis pivot axis.

9. The scooter of claim 1, wherein the wheel support chassis operatively retains the first front wheel and the second front wheel relative to the steering pivot axis such that a first torque is less than a second torque;
   wherein the first torque is a torque about the steering pivot axis that is generated by a first lateral frictional force between the first front wheel and a riding surface when the scooter is being propelled across the riding surface by the rider; and
   wherein the second torque is a torque about the steering pivot axis that is generated by a second lateral frictional force between the second front wheel and the riding surface when the scooter is being propelled across the riding surface by the rider.

10. The scooter of claim 1, wherein in the forward straight orientation, the second front rotational axis is rearward of the steering pivot axis, and
wherein in the forward straight orientation, the first front rotational axis is forward of the steering pivot axis.

11. The scooter of claim 1, wherein the steering assembly further includes a chassis pivot axis biasing mechanism configured to provide a chassis pivot axis restoring force that urges the wheel support chassis toward a predetermined orientation relative to the steering pivot axis.

12. The scooter of claim 11, wherein the predetermined orientation is a level orientation in which a line between a first front contact point of the first front wheel and a second front contact point of the second front wheel is level.

13. The scooter of claim 11, wherein the predetermined orientation is a rearward down orientation in which a line from a first front contact point of the first front wheel and a second front contact point of the second front wheel is sloped downward.

14. The scooter of claim 1, wherein the rear wheel is inline with the first front wheel and with the second front wheel when the steering assembly is in the forward straight orientation.

15. The scooter of claim 1, wherein the body includes a rider platform having an upper surface configured for the rider to stand on with one foot while contacting a riding surface with the rider's other foot; and
wherein the scooter is configured to be steered in a steering direction by the rider in the following manners:
by the rider leaning in the steering direction on the upper surface of the rider platform without rotating the steering shaft relative to the body about the steering pivot axis;
by the rider pivoting the steering shaft in the steering direction relative to the riding surface without rotating the steering shaft relative to the body about the steering pivot axis; and
by the rider rotating the steering shaft relative to the body about the steering pivot axis.

16. A scooter, comprising:
a body configured to support a rider;
a rear wheel rotatingly coupled to the body; and
a steering assembly that includes:
(i) a steering shaft rotationally coupled to the body about a steering pivot axis and configured to permit rotation of the steering assembly about the steering pivot axis among a plurality of steering orientations that includes at least a forward straight orientation, in which the steering assembly is oriented to direct the scooter on a straight, forward trajectory, and a turning orientation, in which the steering assembly is oriented to direct the scooter on a curved trajectory;
(ii) a wheel support chassis pivotally coupled to the steering shaft for rotation about a chassis pivot axis;
(iii) a first front wheel rotatingly coupled to the wheel support chassis about a first front rotational axis; and
(iv) a second front wheel rotatingly coupled to the wheel support chassis about a second front rotational axis, wherein the second front wheel is at least substantially inline with the first front wheel such that a line that extends perpendicular to the first and second front rotational axes intersects the first and second front wheels, and, while the steering assembly is in the forward straight orientation, the second front wheel is located closer to the rear wheel than the first front wheel;
wherein the wheel support chassis operatively retains the first front wheel and the second front wheel relative to the steering pivot axis such that, when the scooter is being propelled across a riding surface by the rider and the rider imparts a lean angle to the scooter without rotating the steering shaft about the steering pivot axis, a turning net torque generated between the steering assembly and the riding surface urges the steering assembly into a lean-induced steering orientation in the direction of the lean angle; and
wherein the wheel support chassis operatively retains the first front wheel and the second front wheel relative to the steering pivot axis such that, when the scooter is being propelled across the riding surface by the rider and the steering assembly is perturbed from the lean-induced steering orientation, a net restoring torque generated between the steering assembly and the riding surface urges the steering assembly to return toward the lean-induced steering orientation.

17. The scooter of claim 16, wherein the scooter defines a neutral orientation when the steering assembly is in the forward straight orientation and the scooter is in an upright orientation on the riding surface;
wherein, when the scooter is in the neutral orientation:
(i) a first mounting offset distance is defined as a minimum distance between the chassis pivot axis and a first plane that extends perpendicular to the riding surface and parallel to the first front rotational axis; and
(ii) a second mounting offset distance is defined as a minimum distance between the chassis pivot axis and a second plane that extends perpendicular to the riding surface and parallel to the second front rotational axis; and
wherein the first mounting offset distance is less than the second mounting offset distance.

18. The scooter of claim 16, wherein the net restoring torque includes:
(i) a first restoring torque about the steering pivot axis, wherein the first restoring torque is generated by a first lateral frictional force between the first front wheel and the riding surface; and
(ii) a second restoring torque about the steering pivot axis, wherein the second restoring torque is generated by a second lateral frictional force between the second front wheel and the riding surface; and
wherein the second restoring torque is greater than the first restoring torque.

19. The scooter of claim 16, wherein the turning net torque includes:
(i) a first turning torque about the steering pivot axis, wherein the first turning torque is generated by a first lateral frictional force between the first front wheel and the riding surface; and
(ii) a second turning torque about the steering pivot axis, wherein the second turning torque is generated by a second lateral frictional force between the second front wheel and the riding surface; and
wherein the second turning torque is greater than the first turning torque.

20. The scooter of claim 16, wherein the wheel support chassis operatively retains the first front wheel and the second front wheel relative to the steering pivot axis such that, when the rider is being supported by the body, a first normal force between the first front wheel and a riding surface is greater than a second normal force between the second front wheel and the riding surface.

21. The scooter of claim 16, further comprising a chassis pivot stop that is configured to restrict rotation of the wheel support chassis about the chassis pivot axis to within a chassis pivot angle range.

22. The scooter of claim 16, wherein the steering assembly further includes a chassis pivot axis biasing mechanism configured to provide a chassis pivot axis restoring force that urges the wheel support chassis toward a predetermined orientation relative to the steering pivot axis.

23. The scooter of claim 22, wherein the predetermined orientation is a level orientation in which a line between a first front contact point of the first front wheel and a second front contact point of the second front wheel is level.

24. A scooter, comprising:
   a body configured to support a rider;
   a rear wheel rotatingly coupled to the body;
   a steering assembly that includes:
      (i) a steering shaft rotationally coupled to the body about a steering pivot axis and configured to permit rotation of the steering assembly about the steering pivot axis among a plurality of steering orientations that includes at least a forward straight orientation, in which the steering assembly is oriented to direct the scooter on a straight, forward trajectory, and a turning orientation, in which the steering assembly is oriented to direct the scooter on a curved trajectory;
      (ii) a wheel support chassis pivotally coupled to the steering shaft for rotation about a chassis pivot axis;
      (iii) a first front wheel rotatingly coupled to the wheel support chassis about a first front rotational axis; and
      (iv) a second front wheel rotatingly coupled to the wheel support chassis about a second front rotational axis, wherein the second front wheel is at least substantially inline with the first front wheel such that a line that extends perpendicular to the first and second front rotational axes intersects the first and second front wheels, and further wherein the second front wheel is located closer to the rear wheel than the first front wheel when the steering shaft is in the forward straight orientation;
   wherein the wheel support chassis operatively retains the first front wheel and the second front wheel relative to the steering pivot axis such that a first torque is less than a second torque;
   wherein the first torque is a torque about the steering pivot axis that is generated by a first lateral frictional force between the first front wheel and a riding surface when the scooter is being propelled across the riding surface by the rider; and
   wherein the second torque is a torque about the steering pivot axis that is generated by a second lateral frictional force between the second front wheel and the riding surface when the scooter is being propelled across the riding surface by the rider; and
   wherein the scooter further includes a chassis pivot stop configured to restrict rotation of the wheel support chassis about the chassis pivot axis to within a chassis pivot angle range.

25. The scooter of claim 24, wherein the chassis pivot stop is configured to permit rotation of the first front wheel about the first front rotational axis and rotation of the second front wheel about the second front rotational axis when the chassis pivot stop is engaged to restrict rotation of the wheel support chassis about the chassis pivot axis.

26. The scooter of claim 24, wherein the steering assembly includes the chassis pivot stop.

27. The scooter of claim 24, wherein a first outer diameter of the first front wheel is greater than a second outer diameter of the second front wheel.

28. The scooter of claim 24, wherein the wheel support chassis operatively retains the first front wheel and the second front wheel relative to the steering pivot axis such that, when the rider is being supported by the body, a first normal force between the first front wheel and a riding surface is greater than a second normal force between the second front wheel and the riding surface.

29. The scooter of claim 24, wherein the scooter defines a neutral orientation when the steering assembly is in the forward straight orientation and the scooter is in an upright orientation on a planar riding surface; and
   further wherein in the neutral orientation, the first front wheel forms a first front contact point with the planar riding surface, the second front wheel forms a second front contact point with the planar riding surface, and the rear wheel forms a rear contact point with the planar riding surface.

30. The scooter of claim 29, wherein the first front contact point is forward of a point where the steering pivot axis intersects the planar riding surface, and the second front contact point is rearward of the point where the steering pivot axis intersects the planar riding surface.

31. The scooter of claim 29, wherein, when the scooter is in the neutral orientation:
   (i) a first mounting offset distance is defined as a minimum distance between the chassis pivot axis and a first plane that extends perpendicular to the planar riding surface and parallel to the first front rotational axis; and
   (ii) a second mounting offset distance is defined as a minimum distance between the chassis pivot axis and a second plane that extends perpendicular to the planar riding surface and parallel to the second front rotational axis;
   wherein the first mounting offset distance is less than the second mounting offset distance.

32. The scooter of claim 29, wherein, when the scooter is in the neutral orientation:
   (i) a first mounting offset distance is defined as a minimum distance between the chassis pivot axis and a first plane that extends perpendicular to the planar riding surface and parallel to the first front rotational axis; and
   (ii) a second mounting offset distance is defined as a minimum distance between the chassis pivot axis and a second plane that extends perpendicular to the planar riding surface and parallel to the second front rotational axis;
   wherein the first plane is forward of the chassis pivot axis and the second plane is rearward of the chassis pivot axis.

33. The scooter of claim 24, wherein in the forward straight orientation, the second front rotational axis is rearward of the steering pivot axis, and
   wherein in the forward straight orientation, the first front rotational axis is forward of the steering pivot axis.

34. The scooter of claim 24, wherein the steering assembly further includes a chassis pivot axis biasing mechanism configured to provide a chassis pivot axis restoring force that urges the wheel support chassis toward a predetermined orientation relative to the steering pivot axis, and further wherein the predetermined orientation is a level orientation in which a line between a first front contact point of the first front wheel and a second front contact point of the second front wheel is level.

35. The scooter of claim 24, wherein the steering assembly further includes a chassis pivot axis biasing mechanism configured to provide a chassis pivot axis restoring force that urges the wheel support chassis toward a predetermined orientation relative to the steering pivot axis, and further wherein the predetermined orientation is a rearward down orientation in which a line from a first front contact point of the first front wheel and a second front contact point of the second front wheel is sloped downward.

36. The scooter of claim 24, wherein the rear wheel is inline with the first front wheel and with the second front wheel when the steering assembly is in the forward straight orientation.

37. The scooter of claim 24, wherein the body includes a rider platform having an upper surface configured for the rider to stand on with one foot while contacting a riding surface with the rider's other foot; and
    wherein the scooter is configured to be steered in a steering direction by the rider in the following manners:
        by the rider leaning in the steering direction on the upper surface of the rider platform without rotating the steering shaft relative to the body about the steering pivot axis;
        by the rider pivoting the steering shaft in the steering direction relative to the riding surface without rotating the steering shaft relative to the body about the steering pivot axis; and
        by the rider rotating the steering shaft relative to the body about the steering pivot axis.

\* \* \* \* \*